United States Patent
Rappaport et al.

(10) Patent No.: US 6,477,373 B1
(45) Date of Patent: Nov. 5, 2002

(54) METHOD AND APPARATUS TO MAINTAIN CONNECTIVITY FOR MOBILE TERMINALS IN WIRELESS AND CELLULAR COMMUNICATIONS SYSTEMS

(75) Inventors: Stephen S. Rappaport, Stony Brook, NY (US); Yunsang Park, Germantown, MD (US)

(73) Assignee: Research Foundation of State University of New York, Stony Brook, NY (US)

( * ) Notice: Subject to any disclaimer, the term of this patent is extended or adjusted under 35 U.S.C. 154(b) by 0 days.

(21) Appl. No.: 09/636,043

(22) Filed: Aug. 10, 2000

Related U.S. Application Data

(60) Provisional application No. 60/148,151, filed on Aug. 10, 1999.

(51) Int. Cl.[7] .................................................. H04Q 7/20
(52) U.S. Cl. ........................ 455/436; 455/450; 455/452; 455/510
(58) Field of Search ................................. 455/436, 435, 455/423, 450, 452, 509, 510, 512, 67.1

(56) References Cited

U.S. PATENT DOCUMENTS

| | | | | |
|---|---|---|---|---|
| 5,570,411 A | * | 10/1996 | Sicher ......................... | 455/450 |
| 5,615,249 A | * | 3/1997 | Solondz ....................... | 455/450 |
| 5,805,995 A | * | 9/1998 | Jiang et al. .................. | 455/436 |
| 5,812,656 A | * | 9/1998 | Garland et al. ......... | 379/208.01 |
| 5,826,198 A | * | 10/1998 | Bergins et al. ............. | 455/557 |
| 5,991,287 A | * | 11/1999 | Diepstraten et al. ........ | 370/338 |
| 6,061,559 A | * | 5/2000 | Eriksson et al. ............ | 455/414 |
| 6,131,029 A | * | 10/2000 | Roberts ....................... | 455/438 |
| 6,236,860 B1 | * | 5/2001 | Hagting et al. ............. | 455/436 |

\* cited by examiner

Primary Examiner—Edward F. Urban
Assistant Examiner—Erika A. Gary
(74) Attorney, Agent, or Firm—F. Chau & Associates, LLP

(57) ABSTRACT

The present invention is directed to a system and method that allows mobile platforms each supporting any of a variety of call types, and each having differing mobility characteristics, to maintain connectivity to a backbone network in spite of unreliable radio links that occasionally fail. It accomplishes this by using automatic and user-transparent reconnection attempts for appropriate call sessions when an interruption of the link occurs. The network may be supporting a variety of different call types simultaneously. Access to network connectivity resources can be provided according to call session priority based on (for example, call session type, platform mobility, hand-off status, and user class (fee-for-service)) criteria. The technology allows support of suspended sessions and uses repeated reconnection attempts with priority access to network resources. It also provides for hand-offs of suspended sessions to neighboring gateways as mobile terminals move throughout the service area. In a network that uses this technology, for example, voice calls (typical of time-sensitive stream traffic) may preempt resources of time-insensitive data calls causing suspended sessions that do not result in session failures. Priority access for hand-offs of active sessions with respect to new call sessions can be accommodated. Mobile users that have some autonomy or who are perhaps exchanging time-insensitive data with a remote site can continue to function essentially undisturbed by link failures since the connectivity and reconnection procedures are managed by the network in a manner that is transparent to the end users. Mobile computing sessions and delay-insensitive data communications, for example, will be able to continue, largely unaware of link failures.

25 Claims, 10 Drawing Sheets

Flow chart of events in the lifetime of a session:  $(1)^* = \dfrac{\mu(g)}{\mu_D(g) + \mu(g)}$, $(2)^* = \dfrac{\mu_D(g)}{\mu_D(g) + \mu(g)}$,  $(3)^* = \dfrac{\mu_r(k,g)}{\mu_D(g) + \mu_r(k,g)}$, and  $(4)^* = \dfrac{\mu_D(g)}{\mu_D(g) + \mu_r(k,g)}$ Hand-off failure probability ($H = 3$).

Blocking probability.

Forced termination probability for various values of $N$ ($H = 3$ and $C_h = 2$).

Forced termination probability for various values of $H$ ($N = 3$ and $C_h = 2$).

Forced termination probability for various values of $C_h$ ($H = 3$, $N = 3$).

Non-maximum termination probability for various values of $H$ ($N = 3$ and $C_h = 2$).

Maximum termination probability for various values of $N$ ($H = 3$ and $C_h = 2$).

Average time per suspension ($H = 3$ and $C_h = 2$).

Fractional suspension time ($H$ = 3 and $C_h$ = 2).

Blocking probability of voice type sessions: $C$ = 15, $v$ (1,0)= $v$ (2,0)= 300.

Forced termination probability of voice type sessions: $C$ = 15, $v(1,0) = v(2,0) = 300$.

Forced termination probability of data type sessions with various $C_h$: $C$ = 15, $v(1,0) = v(2,0) = 300$, $N$ = 3, $H$ = 3.

Forced termination probability of data type sessions with various $N$: $C=15$, $v(1,0)=v(2,0)=300$, $C_h=2$, $H=3$.

Forced termination probability of data type sessions with various $H$: $C=15$, $v(1,0)=v(2,0)=300$, $C_h=2$, $N=3$.

METHOD AND APPARATUS TO MAINTAIN CONNECTIVITY FOR MOBILE TERMINALS IN WIRELESS AND CELLULAR COMMUNICATIONS SYSTEMS

REFERENCE TO RELATED APPLICATION

This application is based on a provisional application, U.S. Ser. No. 60/148,151, filed on Aug. 10, 1999

GOVERNMENT LICENSE RIGHTS

The present invention was developed in part by the Department of Naval Research under Grant No. N00014-15530 and the United States National Science Foundation under Grant No. NCR 94-15530. The United States Government has certain rights to the invention.

BACKGROUND

1. Technical Field

The present invention relates generally to a mobile communication systems and, in particular, to a system and method for controlling admission to a mobile communications system that provides reliable connectivity and maintains mobile user connectivity between mobile platforms and the communication network by automatically and transparently attempting to reconnect disrupted links.

2. Description of Related Art

Visions of the future allude to unprecedented availability of conveniences and services based on pervasive communication and computer technologies. The full realization of these ambitions requires ubiquitous, reliable communications for moving and stationary users on demand. At the core of these services is the reliable communication of voice, data, image, video, multi-media and control messages on networks that are designed to support a wide range of call types as well as users having different mobility characteristics. Significant trends in this regard are underway in essentially every industrialized country and increasingly, a vast communications infrastructure is becoming available which can grow to realize these aspirations.

As noted above, to provide services to mobile users comparable to those obtainable by fixed users via wireline facilities, appropriate attention must be paid to the peculiarities of mobile communications. Modem communications networks that support mobile platforms (pedestrians, vehicles, planes, trains, buses, etc.) often use many wireless gateways connected to a more or less fixed (backbone) network. The gateways, which are sometimes referred to as "cells" "base stations" or "access points," allow tetherless links to nearby mobile platforms. Users within the coverage area of a gateway are said to be in the cell of that gateway. It is to be understood that the term "cell" is used herein in a broad generic sense and can mean gateway, sector, zone, macro-cell, micro-cell, etc. In wireless mobile environments, propagation conditions are often harsh due to multipath and fading, bandwidth is a severe constraint, while mobility support and call management add additional complexity. Furthermore, the network must support disparate call types whose distinct needs must be accommodated. Disparate call types may have different measures of quality and generally require different amounts and types of communications resources for acceptable service. Various resource types that may be needed for mobile communications include, for example, radio bandwidth (channels), buffer space at the gateways and in the backbone network, antenna beam steering system components (including tracking and steering processors at the gateways), call supervising processors at the gateways and in the backbone network, transmitted signal power at the gateways and at the mobile stations, access to control channels, and computational capability in various network components.

With conventional and future wireless and cellular systems that implement various call types (thereby requiring various resource types), appropriate attention must be paid to the peculiarities of mobile communications. In these environments, propagation conditions are often harsh due to multipath and fading, bandwidth is a severe constraint, while mobility support and call management add additional complexity. In addition, since tetherless or radio links to mobile platforms are of variable quality and change with time, they often fail. Accordingly, a lower layer admission control protocol and system that is capable of ameliorating the effects of such failures by maintaining a connection from an active mobile user to the network for the benefit of higher layer protocols is highly desirable.

SUMMARY OF THE INVENTION

The present invention is directed to a system and method for controlling admission to a mobile communications system, which allows mobile platforms each supporting any of a variety of call types, and each having differing mobility characteristics, to maintain connectivity to a backbone network in spite of unreliable radio links that occasionally fail. The present invention employs an admission protocol that provides automatic and user-transparent reconnection attempts for appropriate call sessions when an interruption of the link occurs. Further, a network that employs an admission protocol of the present invention may support a variety of different call types simultaneously, wherein access to network connectivity resources can be provided according to call session priority based on (for example, call session type, platform mobility, hand-off status, and user class (fee-for-service)) criteria. The admission control protocol provides support of suspended sessions and uses repeated reconnection attempts with priority access to network resources, and provides for hand-offs of suspended sessions to neighboring gateways as mobile terminals move throughout the service area.

In a network that employs an admission control protocol according to the present invention, voice calls, for example (or other time-sensitive stream traffic) may preempt resources of time-insensitive data calls, which result in suspended sessions that do not result in session failures. Priority access for hand-offs of active sessions with respect to new call sessions can also be accommodated. Mobile users that have some autonomy or who are perhaps exchanging time-insensitive data with a remote site can continue to function essentially undisturbed by link failures since the connectivity and reconnection procedures are managed by the network in a manner that is transparent to the end users. Mobile computing sessions and delay-insensitive data communications, for example, will be able to continue, largely unaware of link failures.

Since the present invention can be applied to admission control of sessions that are supported at each gateway, it is not necessary that a session that is admitted to a cell have dedicated access to resources. Thus, because some users may emit/receive data in bursts, other users who have been admitted to a cell can share the resources. This allows efficient resource use through rapid access and relinquishment of dedicated resources managed by the media access communications layer.

These and other aspects, features and advantages of the present invention will be described or become apparent from the following detailed description of preferred embodiments, which is to be read in connection with the accompanying drawings.

DETAILED DESCRIPTION OF PREFERRED EMBODIMENTS

Figure 1:
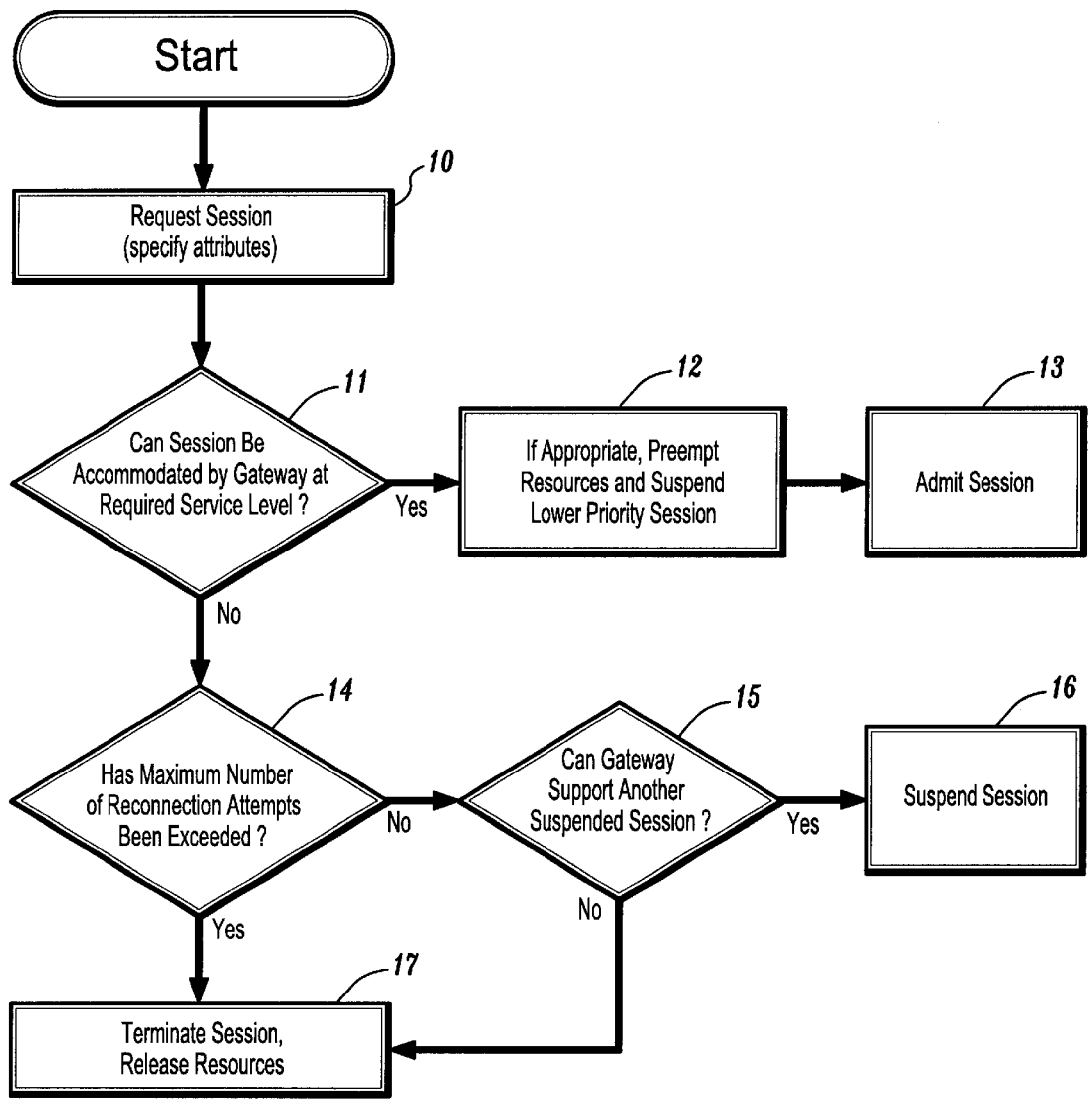
FIG. 1 is a flow diagram of a method for controlling admission to a communications network according to one aspect of the present invention.

In general, the present invention is directed to a system and method for controlling admission of session requests and maintaining connectivity of mobile platforms to a communications network. The present invention is particularly advantageous for implementation with, e.g., cellular communication systems that seamlessly support services for a wide range of user needs, including voice, data, video and multi-media. Indeed, although is envisioned that mobile users will substantially engage in computer processing in an off-line mode, such users will occasionally connect to a network in order to exchange data and/or files in various modalities. With increasing demand for a variety of wireless services, technologies that can potentially support increasingly smart mobile terminals and an array of services such as multi-media, voice, and mobile computing are of interest. ATM/B-ISDN offers an approach with flexible bandwidth allocation, high speed, and quality of service (QoS) selection. In addition, ATM can be used in the wireless context (WATM). Furthermore, rerouting of packets in the fixed network to accommodate ATM type communications with mobile users can be implemented as in known in the art. Moreover, multiple links from a mobile user to network base stations may be employed for the purpose of accommodating users with different bandwidth needs.

In adapting these (and other) technologies that were initially conceived in the context of wireline services, appropriate attention must be paid to the peculiarities of mobile communications. In these environments, propagation conditions are often harsh due to multipath and fading, bandwidth is a severe constraint, while mobility support and call management add additional complexity. In addition, since tetherless or radio links to mobile platforms are of variable quality and change with time, they often fail. To ameliorate and combat the effects of such failures, the present invention employs a connection-oriented approach wherein reliable connectivity is provided between mobile platforms and the backbone network in spite of such link failures. An admission control procedure and a lower layer protocol is employed that attempts to maintain a connection from an active mobile user to the network for the benefit of higher layer protocols, which assume that the physical link is intact. A lower layer admission control protocol according to one aspect of the present invention provides connectivity through transparent reconnection attempts, which are invoked when the link fails. It should be especially noted that just because a connection is established between a mobile user and the network, this does not necessarily imply that specific resources are dedicated exclusively to an individual mobile user and the session. The only implication is that a session for which such a connection has been established (i.e., an admitted session) can use it, perhaps in a packet-oriented mode, as well as share network resources with other users who also have "connections." Rapid assignment of rights to use specific resources is then managed by a media access protocol that interacts with admitted sessions. This allows efficient resource use by users whose communication needs are bursty, and at the same time allows the network to accommodate a wide range of different session types.

In circuit-switched cellular communication systems that are currently deployed for real-time voice, a radio link failure between a mobile user and a base causes the call to be terminated and cleared from the system. In contrast, mobile users that are engaged in mobile computing (or other forms of data transmission) may have the capability to operate semi-autonomously since data communications with the network are packetized and not necessarily streamed. So with appropriate network design, a temporary disconnection from the network may be transparent to the user. Thus, by implementing the techniques described herein, short term radio link disconnections, which are frequent in mobile communications, need not result in failed sessions, discarded information and wasted use of resources. The current invention concerns maintaining connectivity for sessions that have gained admission to network resources. It is applicable to both circuit switched and packet switched systems.

The issue of how to maintain connectivity of a mobile user to the network can be very important for implementation of new mobile wireless services. The present invention provides a system and method that attempts to maintain mobile user connectivity to the network by automatically and transparently attempting to reconnect disrupted links to mobile data users. For this purpose, we consider session-oriented communications and develop a tractable analytical model for traffic performance based on multi-dimensional birth-death processes (as described in detail below). The approach allows consideration of various platform types, such as pedestrians, automobiles, and buses, which may have very different mobility characteristics and performance characteristics, such as blocking, forced session termination, carried traffic, the average time per suspension, and the average number of suspensions per session are computed based on the model.

With a session-oriented approach, a communication session is initiated, during which the user has access to network resources, although this access may be shared with others. Owing to the hostile mobile environment and user mobility, the user's connection to the network during a session may be severed. A session, which may interrupted because of, e.g., failure of a hand-off attempt, is treated as a suspended session. Since the mobile user can act semi-autonomously, such disconnections can be transparent. That is, the mobile user can continue to function in an off-line mode while the system will begin transparent automatic reconnection attempts to reestablish a link to the network. Only after a fixed (given) number of such attempts to reconnect have failed, is the session deemed to have failed. Disconnection of a radio link does not cause the session to be cleared from the system until all reconnection efforts fail. Reconnection attempts for suspended sessions will be initiated while the mobile user application (operating at a higher protocol layer) continues.

It is to be understood that the systems and methods described herein may be implemented in various forms of hardware, software, firmware, special purpose processors, or a combination thereof. In particular, the present invention is preferably implemented as an application comprising program instructions that are tangibly embodied on a program storage device (e.g., magnetic floppy disk, RAM, ROM, Flash memory etc.) and executable by any device or machine comprising suitable architecture. It is to be further understood that, because some of the process steps depicted in the accompanying Figures are preferably implemented in software, the actual connections between such steps may differ depending upon the manner in which the present invention is programmed. Given the teachings herein, one of ordinary skill in the related art will be able to contemplate these and similar implementations or configurations of the present invention Referring now to FIG. 1, a high level flow diagram illustrates a method for controlling admission to a mobile communications network according to one aspect of the present invention. Initially, a mobile platform seeking access to network resources (i.e., admission) will transmit a session request to an appropriate gateway specifying attributes associated with the required service level of the mobile platform (step 10). It is to be understood that a session request provided by a mobile terminal may comprise any one of the following: (1) a request for a new session; (2) a request for a hand-off of an active session; (3) a request for a retry attempt; or (4) a request for a hand-off attempt of a suspended session. In accordance with the present invention, it is possible that a mobile platform with a suspended session on board leaves its current cell. Thus, reconnection attempts described herein comprise at least two types of reconnection attempts—retry attempts and hand-off attempts of suspended sessions. Retry attempts are those session requests that are sent to the same gateway that supported the session in the mobile user's last interaction with the backbone network. Nominally, these attempts are for (renewed) access to resources at the gateway that is currently providing service (i.e., control channels) for the suspended session. On the other hand, hand-off attempts of suspended sessions are made when the mobile platform moves out of the cell, or signal propagation changes occur, so that the mobile favors an alternative gateway for service. When a mobile platform with a suspended session (or active session) on board leaves the current cell, a request for a hand-off attempt is initiated to the appropriate gateway.

As demonstrated in further detail below, the criteria used for admitting new sessions (e.g., voice sessions, data sessions) or hand-off of either active or suspended sessions at a gateway may depend on any number of attributes that are specified in connection with the session request (step 10) including, but not limited to, the session type (data session, voice session), platform mobility, whether the session is a fee-for-service priority class, requested service quality and/ or data rate, whether the requested session is a new session or a suspended session (retry attempt), whether the requested session is a hand-off attempt of an active session or suspended session, and/or the estimated resources needed to accommodate the session. By way of example, in a network that implements an admission control protocol according to the present invention, voice sessions (or other time-sensitive stream traffic), for example, may preempt resources of time-insensitive data calls causing suspended sessions that do not result in session failures. Priority access for hand-offs of active sessions with respect to new sessions can be accommodated. Mobile users that have some autonomy or who are perhaps exchanging time-insensitive data with a remote site can continue to function essentially undisturbed by link failures since the connectivity and reconnection procedures are managed by the network in a manner that is transparent to the end users. So link interruptions can be transparent to some users. High priority call sessions (such as hand-offs of active voice or delay sensitive sessions) may result in preemption of resources from some lower priority sessions. These lower priority sessions may be suspended. Thus, the support of suspended sessions is transparent to these high priority users.

Moreover, in a preferred embodiment of the current invention, when the physical connection between a mobile terminal and the network fails, the session is suspended and the mobile terminal will attempt to reconnect by successive reconnection requests made at random time intervals. A maximum number of reconnection attempts, N, is allowed for each suspended session. If a reconnection has not been secured after this maximum is reached, the session is considered to have failed and the call will be cleared from the system and all system resources used by the session are released. As explained below in greater detail with reference to FIG. 2, the number of reconnection attempts for suspended sessions is counted and updated in a counter that resides in the mobile terminal. In another embodiment of the present invention, upon the suspension of a session, a timer is also set in the supporting network. If communication is not resumed before the expiration of the timer the network resources reserved for the session will be released for use by other call sessions.

To support suspended sessions and reconnection attempts, the system preferably allocates a suitable number of control channels for signaling. Access to control channels is one of the resources needed to support a session. Since the control channels also use wireless resources (notably bandwidth, buffer space), a maximum number of suspended sessions that the system will allow in each cell (at each gateway), denoted H, is preferably designated. It is to be understood that the number H can differ from cell-to-cell (gateway-to-gateway).

Referring again to FIG. 1, after a session request (step 10), a determination is made as to whether the requested session can be accommodated by the gateway at the requested service level (step 20). In a preferred embodiment of the present invention, this determination is based on, e.g., the maximum number of simultaneous connections (i.e., active sessions), denoted herein as C, that can be supported by the gateway (i.e., each cell or gateway can support a maximum of C connections), as well as priorities (as indicated above) that are designated to particular session types. For example, preferably, a cut-off priority is provided for hand-offs and reconnection attempts, wherein $C_h$ connections (of the maximum number of allowable connections C) in each cell are reserved for hand-off attempts (from mobile platforms entering a cell) and for reconnection attempts from suspended sessions (retry attempts) in the cell. In addition, since voice sessions are especially susceptible to hand-off failures, a cut-off priority is preferably utilized to reserve some resources for a voice session.

Based on the above, in general, when a request for a new session (voice, data) is received (in step 10), a connection will be established for the new session (affirmative result in step 11) if there are fewer than $C-C_h$ active sessions in the cell. As described above, time-sensitive sessions may be afforded priority. For instance, preferably, voice sessions are given preemptive priority over data sessions for using channel resources. Since voice sessions must be transmitted or received on a real time basis, reconnection attempts for voice sessions are preferably not allowed. When a voice session arrives and finds all channels C occupied, an active data session (if any are present) is preferably suspended (step 12) (or possibly terminated) to accommodate it. More specifically, when a voice session arrives in a cell in which all channels are occupied and fewer than H sessions are in suspension, and, at least, one active session is of data type, an arriving voice session will obtain a connection (step 13) but an active data session will be suspended (step 12). The choice of which data session to be suspended or be terminated is assumed to be random. If there are no active data sessions that can be preempted to service the incoming voice session, the voice arrival will not be accommodated. That is, it will be blocked if it is a new call, or terminated if it is a hand-off.

When a session request for a hand-off attempt (of an active session or suspended session) is received (in step 10), a connection will be established (affirmative determination in step 11) and the session will be granted admission (step 13) if there are less than C active sessions in the cell. On the other hand, if there are C active sessions in the cell, the session requesting the hand-off will not be accommodated (negative result in step 11). However, an active session attempting the hand-off to the target cell will be suspended (step 16) if such active session fails to obtain a connection (negative result in step 11) and the gateway can support a suspended session (i.e., there are less than H suspended sessions in the target cell) (affirmative determination in step 15). On the other hand, the active session will be terminated (step 17) if there are C active sessions (negative result in step 11) and H suspended sessions in the target cell (negative result in step 15).

Likewise, a suspended session attempting a hand-off to the target cell will remain suspended (step 16) if such suspended session fails to obtain a connection (negative result in step 11), the number of reconnection attempts by the suspended session has not been exceeded (negative determination in step 14), and the gateway can support a suspended session (i.e., there are less than H suspended sessions in the target cell) (affirmative determination in step 15). On the other hand, the suspended session requesting a hand-off will be terminated (step 17) if there are C active sessions (negative result in step 11) and either the suspended session has exceeded the maximum number of reconnection attempts N (affirmative determination in step 14) or there are H suspended sessions in the target cell (negative result in step 15).

A detailed discussion of a reconnection process and reconnection counting process according to one aspect of the present invention will now be described with reference to FIG. 2. As indicated above, reconnection attempts comprise retry attempts and hand-off attempts of suspended sessions. Retry attempts are those session requests that are sent to the same gateway that supported the session in the mobile user's last interaction with the backbone network. Nominally, these attempts are for (renewed) access to resources at the gateway that is currently providing service (i.e., control channels) for the suspended session. On the other hand, hand-off attempts of suspended sessions are made when the mobile platform moves out of the cell, or signal propagation changes occur, so that the mobile favors an alternative gateway for service. As described in detail below, when the physical connection between a mobile terminal and the network fails (e.g., unsuccessful handoff), the session may be suspended and the mobile terminal will attempt to reconnect by successive reconnection requests that are made at random time intervals (referred to as "trial times" as described in detail below). A maximum number of reconnection attempts N are allowed for each suspended session. If a reconnection has not been secure after this maximum is reached, the session is considered to have failed and the session will be cleared from the system and all system resources used by the session are released. The number of reconnection attempts for suspended sessions is counted and updated in a counter in the mobile terminal.

Figure 2:
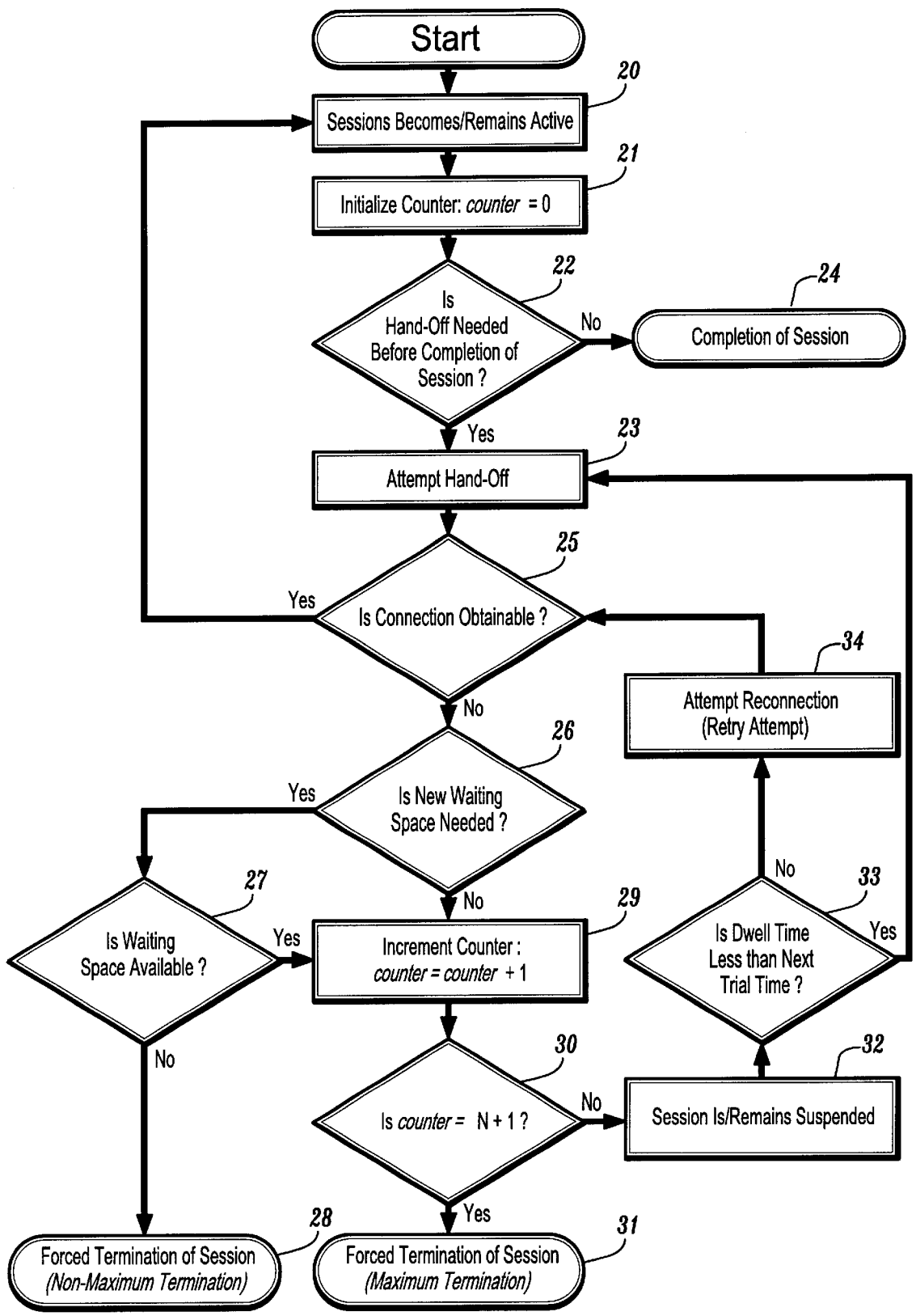
FIG. 2 is a flow diagram of a method for reconnecting to a communications network according to one aspect of the present invention.

Referring now to FIG. 2, initially, it is assumed that a session is either activated (e.g., a new session or a suspended session that is admitted) or remains active (e.g., due to a successful handoff) in a given cell (step 20). When the session becomes/remains active, the reconnection attempt counter of the mobile platform is set to 0 (step 21). It is to be understood that even though a session has experienced suspension, the counter will be reset to 0 if a suspended session is activated. A session may experience many suspension experiences during its lifetime before it is successfully completed.

If a handoff is needed before the completion of an active session (affirmative result in step 22) (e.g., when the mobile platform moves out of the cell, or signal propagation changes occurs, so that the mobile terminal favors an alternative gateway for service), the mobile terminal will request a hand-off (step 24). On the other hand, if a hand-off is not necessary before the completion of an active session (negative result in step 22), the session will be successfully completed (step 24) and the system resources are cleared.

Upon a hand-off attempt (step 23), a determination is made as to whether a connection in the target gateway is currently available for the active session (step 25). If the target gateway has less that C active sessions, the arriving hand-off call can successful obtain a connection (affirmative result in step 25) and the session will remain active in the target cell (return to step 20). On the other hand, an active session that fails to gain access to a connection will lose its wireless link. In conventional cellular systems, the session would be cleared from the system. In accordance with the present invention, however, if an active session loses it wireless link (i.e., is disconnected), the session may either be suspended and reconnection attempts will be initiated, or the session is terminated, depending on the circumstances.

More specifically, when a mobile terminal with an active session (or suspended session) moves to a target cell that has insufficient resource available to accommodate the attributes of the session such that a connection is not available (e.g., the target cell has C active sessions) (negative determination in step 25), a determination is made as to whether new waiting space is needed (step 26). In particular, a determination is made (in step 26) as to whether the session in question is the result of an unsuccessful hand-off attempt, which would require the cell to support an additional suspended session (no retry attempt of a suspended session would require new waiting space since the suspended session already occupies one of the H spaces allowed for suspended sessions in each cell). Therefore, if it is determined that new waiting space is needed (affirmative determination in step 26) (e.g., because of an unsuccessful hand-off (i.e., non admitted) of an active or suspended session), a determination is then made as to whether the cell has waiting space available (step 27). If the cell has H suspended sessions (a negative determination in step 27), the session will be terminated. In other words, if in a target cell, there are insufficient resources available to accommodate a hand-off of a session having the attributes of a suspended or active session, and the total number of suspended sessions in the target cell is H, the session will not be admitted in the target cell (at the target gateway). So, even if a suspended or active session has not exhausted the allowable number of reconnection attempts N, the session will be forced into termination if it fails its hand-off attempt because the system already has H suspended sessions in the target cell. This forced termination is what is refereed to herein as a non-maximum termination.

On the other hand, if new waiting space is not required (negative determination in step 26) (due to an unsuccessful retry attempt) or waiting space is available for a session (active or suspended) of an unsuccessful hand-off (affirmative determination in step 27), the reconnection counter of the mobile terminal will be incremented by one (step 29). In other words, if in a target cell, there are insufficient resources available to accommodate the session but there are fewer than H suspended sessions, the hand-off will be supported as a suspended session at the target gateway and the reconnection efforts will continue. A modification of the backbone network route between the remote user and the new serving gateway will be made so that communications can resume if a reconnection succeeds at this gateway. (Some resources at the previous gateway may be released). Moreover, if a retry attempt in the cell is unsuccessful (i.e., a suspended session supported by the cell fails reconnection attempt with the cell), the reconnection efforts will continue. In the target cell, additional reconnection attempts (e.g., retry attempts) may be made and the counter will be incremented for each unsuccessful attempt.

After the reconnection counter of the mobile terminal is incremented (step 29), a determination is made as to whether the number of reconnection attempts has exceeded the maximum number allowed N (step 30). If the suspended session has exceeded the number of allowed reconnection attempts (affirmative determination in step 30), the session will be terminated (step 31). In other words, when a mobile platform with an active or suspended session moves to a target cell that has no channels available (failed hand-off), the session will be/remain suspended in the target cell (if there are fewer than H suspended sessions already in the target cell) and the mobile's reconnection attempt counter will be incremented. In the target cell, additional reconnection attempts may be made. The reconnection counter of the mobile will be incremented for each unsuccessful attempt. It may happen that the supporting platform moves to yet another cell. At that time, a hand-off attempt of the suspended session will be made to the new target cell. This hand-off attempt will count as an attempted reconnection in the target cell (i.e., a hand-off attempt generated by a suspended session is counted as one reconnection attempt in the sense that the reconnection counter will be incremented and, as such, the last attempt before termination can be either a retry attempt or a hand-off attempt). On the other hand, if the hand-off attempt succeeds in getting a channel, the session will be continued and the reconnection counter will be set to 0. If there are no channels available and there are H suspended sessions in the new target cell, the session will be terminated. For non-terminated sessions, the process will continue in this way as long as there has not been N consecutive failed reconnection (hand-off or retry) attempts. When this limit is reached the session will be forced to terminate. The forced termination of an N-suspended session due to the maximum number of allowable reconnection attempts being met is referred to herein as a maximum termination. The mobile terminal may confirm this termination to the network via the control channel. It is to be appreciated that a timeout in the network can also be used as a backstop.

Referring back to FIG. 2, if the maximum number of reconnection attempts has not been met (negative determination in step 30), the session will remain suspended (if it was already suspended) or become suspended (if it was an active session) (step 32). After each failed reconnection attempt, a random time is generated for the next retry attempt epoch, which is referred to herein as the next trail time (or, simply, the retry attempt time). Furthermore, a dwell time is determined, which is a random variable defined as the duration of time that a two-way link of satisfactory quality can be maintained between a platform and its current base, for whatever reason. The dwell time of platform in a cell depends on many factors including; mobility, signal power, propagation conditions, fading, etc. For purposes the present discussion, it is assumed that the dwell time is simply a random hand-off epoch (although, as explained below, the dwell time is used as a component in constructing a model of the present invention). If a hand-off epoch arises before current retry attempt epoch (i.e., the dwell time is less than the next trail time) (affirmative determination in step 33), a hand-off attempt of a suspended session will occur (step 23). On the other hand, if the current retry attempt epoch arises before a hand-off epoch (i.e., the dwell time is not less than the next trail time) (negative determination in step 33), a retry attempt will occur (step 34). In either reconnection attempt case, if the attempt fails, the reconnection counter of the mobile terminal will be incremented by one. IF the attempt succeeds, the session becomes active (affirmative result in step 25, return to step 20) and the counter is reset to 0 (step 21). Again, as described in detail above, this process will continue until one of the following events occur: (1) the session is successfully completed (step 24); (2) the session is forced to terminate due to the lack of waiting space in the target cell when a hand-off attempt is made (step 28); or (3) there are N successive failed reconnection attempts (step 31).

Advantageously, the present invention allows mobile platforms each supporting any of a variety of call types, and each having differing mobility characteristics, to maintain connectivity to a backbone network in spite of unreliable radio links that occasionally fail. It is applicable to circuit switched and packet switched networks, and provides for management of disparate call types as well as call handoffs. The scheme is applicable to admission control of sessions that are supported at each gateway. It is not necessary that a session that is admitted at a gateway have dedicated exclusive access to resources. Thus, because some sessions may emit/receive data in bursts, other sessions that have been admitted to a cell can share the resources. This allows efficient resource use through rapid access and relinquishment of dedicated resources managed by the media access communications layer. This invention affords many advantages over prior art systems. For instance, the present invention:

1. provides reliable connectivity of mobile users to a backbone network in spite of unreliable links;
2. provides full support of mobile platforms having different mobility characteristics;
3. provides support of disparate call session types;
4. allows single or multiple reconnection attempts for appropriate suspended sessions;
5. provides support of retry attempts for suspended sessions;
6. provides support of hand-offs for suspended sessions;
7. considers multiple resources and mobility in session admission, hand-off and reconnection criteria;
8. provides prioritized admission, hand-off and reconnection criteria based on session attributes;
9. is applicable to circuit switched or packet switched mobile networks;
10. allows reconnection attempts that are transparent to end users; and
11. is applicable to wireless communication systems employing any of the primary air interface technologies, including, but not limited to, FDMA, TDMA, CDMA and hybrids.

MODEL DESCRIPTION

To evaluate the performance of the scheme described above, we extended the analytical framework that we have been developing in recent years (see, e.g., S. S. Rappaport, "The Multiple-Call Hand-off Problem in High-Capacity Cellular Communication System," IEEE Trans. Vehic. Technol., August 1991, vol. VT-40, no.3, pp. 546–557; S. S. Rappaport, "Blocking Hand-off and Traffic Performance for Cellular Communication System with Mixed Platforms," IEE (British) Proceedings, Part I, Communications, Speech and Vision, October 1993, vol. 40, no. 5, pp. 389–401; D. Hong and S. S. Rappaport, "Traffic Model and Performance Analysis for Cellular Mobile Radio Telephone Systems with Prioritized and Non-Prioritized Hand-off Procedures," IEEE Trans. Vehic. Technol., August 1986, vol. VT-35, no. 3, pp. 77–92; Y. Park and S. S. Rappaport, "Cellular Communication Systems with Voice and Background Data," pp. 33–42.in 'Mobile Multimedia Communications,' D. J. Goodman and D. Raychaudhuri, eds., Plenum Press, New York, 1997; and C. Purzynski and S. S. Rappaport, "Prioritized Resource Assignment for Mobile Cellular Communication Systems with Mixed Services and Platform Types," IEEE Trans. On Vehicular Technology, August 1996, vol. 45, No.3, pp. 443–458.). The analytical framework decouples a cell from other cells and iteratively determines the average hand-off arrival rate to a cell. Moreover, the hand-off arrival process to a cell is taken as a Poisson point process. These assumptions, which are now used by almost all researchers who do work in this area, also have intuitive appeal, because it is not likely that channels in ALL neighboring cells are either heavily occupied or lightly occupied at the same time. So, if a cell has multiple neighbors, the arrival rate to a cell (which is proportional to the sum of the departure rates from its neighbors) would tend to remain constant about its mean value.

The underlying approach, which uses multidimensional birth-death processes, allows numerical computation of relevant state probabilities and traffic performance measures. The framework we developed obviates the need for dealing with overall system states and allows consideration of the much fewer cell states by invoking a conservation rule that relates mean hand-off and departure rates. While the number of cell states can still be formidable for certain parameter choices, it is quite manageable for many practical configurations of current interest, especially because the cell state transition matrix is sparse. Moreover, we used Gauss-Seidel iteration as part of our solution algorithm. This allows one to deal with only one state balance equation at a time. As the number of channels per cell increases, the number of states increases rapidly, and the approach is not scalable. However, a method to extrapolate results for much larger systems may be employed.

To accommodate the essential features of the present problem, it was necessary to define new state variables to account for suspended sessions and their status (number of reconnection attempts made)—and to reformulate the state balance equations. At the same time we wanted to include consideration of mixed platform types that have different mobility characteristics as well as provide a model that considers priority for hand-off sessions. Additional new performance measures that are meaningful in the present context are introduced and formulated. We had little difficulty in performing the calculations on a current desktop workstation. After developing a suitable state description for the current problem, the global state balance equations for the system are formulated and solved for the state probabilities. These are used to compute important traffic performance measures for the proposed system.

In a model description according to an embodiment of the present invention, a large geographical area is considered containing many spatial zones that are defined by the (satisfactory electromagnetic signal) coverage of specific network gateways (base stations). These spatial zones are referred to herein as cells but it is to be understood that this term is used in a generic sense. The spatial zones can be sectors of a cell, microcells, macrocells, satellite beams, etc. Large numbers of mobile platforms of several types move about in the region. The platform types differ primarily in the mobility characteristics and each platform can support at most one connection at any given time. The maximum number of simultaneous connections that each base station can support is C.

We use the concept of dwell time to characterize platform mobility. This is a random variable defined as the duration of time that a two-way link of satisfactory quality can be maintained between a platform and its current base, for whatever reason. The dwell time of platform in a cell depends on many factors including; mobility, signal power, propagation conditions, fading, etc. Although other generalizations are possible, here we take the probability density function (p.d.f.) of dwell time to be a negative exponential distribution (with a parameter depending on mobility of the platform type). Similarly, the unencumbered session duration and the k-trial time were taken to be n.e.d. random variables (with parameters depending on intended session duration and the value of k, respectively).

In the following we let g be an index that defines the platform type and mobility. Consider a suspended session that has already failed k−1 reconnection attempts. The next reconnection attempt is called the "k-reconnection attempt" where $1 \leq k \leq N$. It is important to emphasize that there are two driving processes that generate reconnection attempts. One is the retry process, which consists of successive statistically independent realizations of a random variable, $T_r(k, g)$, to generate epochs for retry attempt times for a suspended session. The other is the hand-off departure process—because hand-off attempts always try to establish a link and therefore count as reconnection attempts. The random variable gives the time from the previous reconnection event (either hand-off or retry) to the next anticipated retry attempt. The random variable, $T_r(k,g)$, can in general depend on k. Thus, the minimum rate of reconnection attempts depends on the number of attempts that have already been made. Of course, if the supporting platform leaves its current cell before the anticipated retry epoch, a hand-off attempt (to establish a link) will be made at that time and the value of k will be adjusted. If the session is in a suspended state after this attempt, a new random variable (for a retry epoch) will be generated. The random variable, $T_r(k,g)$, generated after the k−1 retry attempt, which represents the maximum time to the next anticipated retry attempt is called the "k-trial time". A suspended session that has not reestablished a link after k−1 reconnection trials and is waiting for the next ($k^{th}$) reconnection attempt, is called a "k-suspended session".

Assume that the system comprises G types of platforms, indexed by $\{g=1,2,3,\ldots,G\}$. The call origination rate from a non-communicating g-type platform is denoted $\Lambda(g)$. We define $\alpha(g)=\Lambda(g)/\Lambda(1)$. The number of non-communicating g-type platforms in any cell is denoted v(g,0). Therefore, the total call origination rate for g-type platforms in a cell is $\Lambda_n(g)=\Lambda(g)\cdot v(g,0)$. It is assumed that the number of non-communicating communicating platforms is much larger than the maximum available connections in a cell so that the call generation rate does not depend on the number of sessions in progress (this is called an infinite population model).

Generally the bandwidth and other resources needed for connection of a call may depend on call type. A model that considers resource use based on call (connection) type may be used. However, we preferably focus on the issue of maintaining connectivity, and it is thus assumed that each active connection requires the same resources. Each cell or gateway can support a maximum of C connections. There are no quotas for specific mobility platform type. Cut-off priority for hand-offs and reconnection attempts is included in the present discussion. Thus, $C_h$ connections in each cell are reserved for hand-off attempts (from platforms entering a cell) and for reconnection attempts from suspended sessions in the cell. A connection will be established for a new call only if there are fewer than C−$C_h$ active sessions in the cell. Hand-off attempts will fail to get a connection if there are C active sessions in the cell. An active session (attempting a hand-off to a target cell) will be suspended if it fails to get a connection but there are less than H suspended sessions in the target cell. It will be terminated if there are C active sessions and H suspended sessions in the target cell.

The platform is considered to "leave" the cell at the expiration of its current (random) dwell time. A communicating platform that leaves a cell generates a hand-off arrival to some other cell. Here the dwell time in a cell for g-type platform is taken as a n.e.d. random variable, $T_D(g)$, having a mean $\overline{T}_D(g)=1/\mu_D(g)$. The k-trial time of a suspended session on g-type platform is a n.e.d. random variable, $T_r(g)$, having a mean $\overline{T}_r(k,g)=1/\mu_r(k,g)$, where $1 \leq k \leq N$, and $\mu_r(k, g)$ (k=1, ... N; g=1, ... G), is the parameter that determines the reconnection attempt rate for a k-suspended session on a g-type platform.

State Description

Consider a single cell. We define the cell state by a sequence of non-negative integers. When a maximum of N reconnection attempts are permitted for a suspended session, the state of the cell can be written as G n-tuples as follows $$\begin{array}{cccccc} u_1 & u_{1,1} & u_{1,2} & u_{1,3} & \cdots & v_{1,N} \\ u_2 & v_{2,1} & v_{2,2} & v_{2,3} & \cdots & v_{2,N} \\ \vdots & \vdots & \vdots & \vdots & \vdots & \vdots \\ u_G & u_{G,1} & v_{G,2} & v_{G,3} & \cdots & v_{G,N} \end{array}$$

where $u_g$ $\{g=1,2,3,\ldots,G\}$ is the number of active sessions on g-type platforms and $v_{g,k}$ $\{g=1,2,\ldots,G; k=1,2,\ldots,N\}$ is the number of k-suspended sessions on g-type platforms. For convenience we order the states using an index $s=0,1,\ldots,S_{max}$. Thereafter, $u_g$ and $v_{g,k}$ can be written explicitly dependent on the state. That is $u_g=u(s,g)$ and $v_{g,k}=v(s,g,k)$.

When the cell is in state s, the following characteristics can be determined. The number of active sessions is $$u(s) = \sum_{g=1}^{G} u(s, g). \qquad (1)$$

The number of suspended sessions on g-type platforms is $$v(s, g) = \sum_{k=1}^{N} v(s, g, k). \qquad (2)$$

The total number of suspended sessions in cell, regardless of platform type, is $$v(s) = \sum_{g=1}^{G} v(s, g). \quad (3)$$

The number of sessions either active or suspended on g-type platforms in the cell is $$J(s,g) = u(s,g) + v(s,g). \quad (4)$$

The total number of sessions in progress that are either active or suspended is $$J(s) = u(s) + v(s). \quad (5)$$

There are constraints on permissible cell states. These include the total number of active sessions in a cell must be less than or equal to maximum supportable connections, $u(s) \leq C$; and the total number of suspended sessions in a cell must be less than or equal to the maximum number of suspended sessions allowed in a cell, $v(s) \leq H$ Driving Processes There are five major driving processes for this problem. We preferably use Markovian assumptions for driving processes to allow solution within the multidimensional birth-death process framework. Each process is listed below:

{n}: generation of new calls
{c}: completion of calls
{h}: hand-off arrival of calls
   {$h_0$}: active session hand-off arrivals
   {$h_1$}: 1-suspended session hand-off arrivals
   ...
   {$h_N$}: N-suspended session hand-off arrivals
{d}: hand-off departure of calls
   {$d_0$}: active session hand-off departures
   {$d_1$}: 1-suspended session hand-off departures
   ...
   {$d_N$}: N-suspended session hand-off departures
{r}: retry attempts The dimension of the new call generation process, {n}, is G, since there are G different types of mobility platforms. Similarly, the dimensions of the hand-off arrival and departure processes, {h} and {d}, are G×(N+1), since N-times of reconnection attempts are permitted for a suspended session besides of existence of active sessions. The dimension of the retry attempt process {r} is G×N, since N types of suspended sessions can arise from G different types of platforms.

Generation of New Calls

A transition into state s, due to a new call arrival on a g-type platform when the cell is in state $x_n$, will cause the state variable $u(x_n,g)$ to be increased by 1. Because of cut-off priority, $C_h$ connections are held for arrivals of hand-off attempts (of active or suspended sessions) and for retry attempts of suspended sessions. Thus a permissible state $x_n$ is a predecessor state of s for a new call arrives on g-type platform, if $u(x_n) < C - C_h$ and the state variables are related by $$u(x_n,g) = u(s,g) - 1$$

$$v(x_n,g,j) = v(s,g,j). \quad (6)$$

The corresponding transition flow is given by $$\gamma_n(s,x_n) = \Lambda_n(g) \quad (7)$$

in which $\Lambda_n(g)$, is the new call arrival rate per cell from platforms of type g.

Completion of Calls

A transition into state s, due to successful completion of a session on a g-type platform when the cell is in state $x_c$, will cause the state variable $u(x_c,g)$ to be decreased by 1. Thus a permissible state $x_c$ is a predecessor state of s for call completion on a g-type platform if the state are related by $$u(x_c,g) = u(s,g) + 1$$

$$v(x_c,g,j) = v(s,g,j). \quad (8)$$

The unencumbered session duration on a g-type platform is a n.e.d. random variable, T(g), having a mean $\overline{T}(g) = 1/\mu(g)$. Then the transition flow into state s from $x_c$ due to a session completion is given by $$\gamma_c(s,x_c) = \mu(g) \cdot v(x_c,g). \quad (9)$$

Hand-Off Arrival of Calls

Active session Hand-Off Arrivals

When a cell has less than C active sessions, arriving hand-off calls can obtain a connection. Thus a permissible state $x_{h0}$ is a predecessor state of s for an active session hand-off arrival on a g-type platform when $u(x_{h0}) < C$ and the state variables are related by $$u(v_{h0},g) = u(s,g) - 1$$

$$v(x_{h0},g,j) = v(s,g,j). \quad (10)$$

When an active session needs a hand-off, it will become a 1-suspended session if the target cell has C active sessions but the total number of suspended sessions in that cell is less than H. A transition into state s, due to an hand-off arrival of active session on a g-type type platform when the cell is in state $x_{h0}$ (in which the cell has C active sessions but the total number of suspended sessions in that cell is less than H), will cause the state variable $v(x_{h0},g,1)$ to increase by 1. Thus a permissible state $x_{h0}$ is a predecessor state of s for hand-off arrival of active session on a g-type platforms when $u(x_{h0}) = C$ and $v(x_{h0}) < H$ if the state variables are related by $$u(x_{h0},g) = u(s,g)$$

$$v(x_{h0},g,1) = v(s,g,1) - 1$$

$$v(x_{h0},g,j) = v(s,g,j), j \neq 1. \quad (11)$$

We let $\Lambda_h$ be the average rate at which hand-off arrivals of active session impinge on the cell and $F_g$ denote the fraction of hand-off arrival of active session that are from g-type platforms. Initially we guess $\Lambda_h$ and $F_g$ but these values are determined by the dynamics of process. We will subsequently determine these values using an iterative approach. The corresponding transition flow for active session hand-off attempts is given by $$\gamma_{h0}(s,x_{h0}) = \Lambda_h \cdot F_g. \quad (12)$$

Hand-Off Arrivals of Suspended Sessions

If the target cell has less than maximum number of simultaneously supportable connections, C, when a k-suspended session hand-off attempt arrives, ($1 \leq k \leq N$), the session will be accommodated and will become an active session in the target cell. Thus a permissible state $x_{hk}$ is a predecessor state of s for hand-off arrivals of k-suspended sessions on g-type platform when $u(x_{hk}) < C$, if the state variables are related by $$u(x_{hk},g)=u(s,g)-1$$

$$v(x_{hx},g,j)=v(s,g,j) \quad (13)$$

where $1 \leq k \leq N$.

Suppose that a target cell has no available channel resources for connection of an arriving hand-off call, but the total number of suspended sessions in that cell is less than maximum number of supportable suspended sessions, H. Then a hand-off attempt will fail and a k-suspended session becomes a (k+1)-suspended session in the target cell unless the mobile's counter indicate k=N. Thus a permissible state $x_{hk}$ is a predecessor state of s for hand-off arrival of k-suspended session on a g-type platform when $u(x_{hk})=C$ and $v(x_{hk})<H$, if the state variable are related by $$u(x_{hk},g)=u(s,g)$$

$$v(x_{hk},g,k+1)=v(s,g,k+1)-1$$

$$v(x_{hk},g,j)=v(s,g,j), j \neq (k+1) \quad (14)$$

where $1 \leq k \leq N$.

It should be remembered that when the counter of the terminal indicates N+1, then the terminal has attempted the maximum allowable number of reconnection attempts. This call will be forced into termination. So, a failure of hand-off attempt when the counter of the terminal is N causes a call to be forced into termination. This type of termination (a call is terminated with k=N) is called maximum termination and is described in detail below in the section, PERFORMANCE MEASURES.

Let $\Lambda_r(k)$ be the average rate at which hand-off arrivals of k-suspended session on a g-type platform impinge on the cell, $F_{rg}(k)$ denote the fraction of hand-off arrival of k-suspended sessions that are from g-type platform. Initially we guess $\Lambda_r(k)$ and $F_{rg}(k)$ but using an iterative method, we will subsequently determine the values required by the dynamics of the process. Then the corresponding transition flow is given by $$\gamma_{hk}(s,x_k)=\Lambda_r(k) \cdot F_{rg}(k) \quad (15)$$

where $1 \leq k \leq N$.

Departure of Hand-Off Calls
Hand-Off Departures of Active Sessions

A transition into state s, due to a hand-off departure of active session on a g-type platform when the cell is in state $x_{d0}$, will cause the state variables $u(x_{d0},g)$ to be decreased by 1. Thus a permissible state $x_{d0}$ is a predecessor state of s for a hand-off departure of active session on a g-type platforms, if the state variables are related by $$u(x_{d0},g)=u(s,g)+1$$

$$v(x_{d0},j)=v(s,g,j). \quad (16)$$

The corresponding transition flow is given by $$\Gamma_{d0}(s,x_{d0})=\mu_D(g) \cdot u(x_{d0},g). \quad (17)$$

Hand-Off Departures of K-Suspended Sessions

A transition into state s, due to a hand-off departure of k-suspended session on a g-type platform when the cell is state $x_{dk}$, will cause the state variable $v(x_{dk},g,k)$ to be decreased by 1. Thus a permissible state $x_{dk}$ is a predecessor state of s for a hand-off departures of k-suspended session on g-type platforms, if the state variables are related by $$u(x_{dk},g)=u(s,g)$$

$$v(x_{dk},g,k)=v(s,g,k)+1$$

$$v(x_{dk},g,j)=v(s,g,j), j \neq k \quad (18)$$

where $1 \leq k \leq N$.

The corresponding transition flow is given by $$\gamma_{dk}(s,x_{dk})=\mu_D(g) \cdot v(x_{dk},g,k) \quad (19)$$

where $1 \leq k \leq N$.

Retry Attempts

If the cell has less than the maximum number of active sessions in progress when a terminal attempts a reconnection trial (either hand-off or retry) for a k-suspended session, the reconnection attempt will succeed and the session will become active. Thus, a transition into state s, due to a retry attempt for a k-suspended session on a g-type platform, when $u(x_r)<C$ and the cell is state $x_r$, will cause the state variable $u(x_r,g)$ increased by 1 and $v(x_r,g,k)$ to be decreased by 1. So, a permissible state $x_r$ is a predecessor state of s for a retry attempt of k-suspended session on a g-type platform, if $u(x_r)<C$ and the state variables are related by $$u(x_r,g)=u(s,g)-1$$

$$v(x_r,g,k)=v(s,g,k)+1$$

$$v(x_r,g,j)=v(s,g,j), j \neq k \quad (20)$$

where $1 \leq k \leq N$.

If the system is supporting C active sessions when the terminal makes a retry attempt for a k-suspended session, the retry attempt will fail. When the counter of terminal indicates less than the N, the terminal will wait for the next reconnection attempt. When a cell is in state $x_r$, a failure of a retry attempt for a k-suspended session on a g-type platform will occur when the mobile's counter indicates less than the maximum allowable reconnection attempts (k<N), will cause the state variable $v(x_r,g,k)$ to be decreased by 1 and $v(x_r,g,k+1)$ to be increased by 1. Thus a permissible state $x_r$ is a predecessor state of s for the failure of a k-repeated trial (k<N) on a g-type platform when $u(x_r)=C$ and $v(x_r)<H$, if the state variables are related by $$u(x_r,g)=u(s,g)$$

$$v(x_r,g,k)=v(s,g,k)+1$$

$$v(x_r,g,k+1)=v(s,g,k+1)-1$$

$$v(x_r,g,j)=v(s,g,j), j \neq k, j \neq k+1 \quad (21)$$

where $1 \leq k \leq N$.

When the counter of the terminal indicates N+1, then the terminal has been attempted maximum allowable reconnection attempts. This call will be forced into termination. So, the failure of a reconnection attempt when the counter of the terminal is N causes a call to be forced into termination. This type of termination (a call is terminated with k=N) is called maximum termination and described in detail in the section, PERFORMANCE MEASURES. Thus a permissible state $x_r$ is a predecessor state of s for the failure of a N-reconnection attempt on a g-type platform when $u(x_r)=C$ and $v(x_r)<H$, if the state variables are related by $$u(x_r,g)=u(s,g)$$

$$v(x_r,g,N)=v(s,g,N)+1$$

$$v(x_r,g,j)=v(s,g,j), j \neq N. \quad (22)$$

The corresponding transition flow is given by $$\gamma_r(s,x_r,k) = \mu_r(k,g) \cdot v(x_r,g,k). \quad (23)$$

Flow Balance Equations

From the above equations, the total transition flow into state s from any permissible predecessor state x can be written as $$q(s,x) = \gamma_n(s,x) + \gamma_c(s,x) + \gamma_h(s,x) + \gamma_r(s,x) + \gamma_d(s,x) \quad (24)$$

where $$\gamma_h(s,x) = \gamma_{h0}(s,x) + \gamma_{h1}(s,x) + \ldots + \gamma_{hN}(s,x), \quad (25)$$

$$\gamma_d(s,x) = \gamma_{d0}(s,x) + \gamma_{d1}(s,x) + \ldots + \gamma_{dN}(s,x), \quad (26)$$

$$\gamma_r(s,x) = \gamma_r(s,x,1) + \gamma_r(s,x,2) + \ldots + \gamma_r(s,x,N), \quad (27)$$

s≠x, and flow into a state has been taken as a positive quantity.

The total flow out of state s is denoted, q(s,s) and is given by $$q(s,s) = -\sum_{\substack{k=0 \\ k \neq s}}^{S_{max}} q(k,s). \quad (28)$$

The statistical equilibrium state probabilities can be found by solving the flow balance equations. This is a set of Smax+1 simultaneous equations.

$$\sum_{j=0}^{S_{max}} q(i,j) \cdot p(j) = 0, \quad i = 0, 1, \ldots, S_{max} - 1 \quad (29)$$

$$\sum_{j=0}^{S_{max}} p(j) = 1, \quad (30)$$

in which, for i≠j, q(i,j) is the net transition flow into state i from state j, and q(i,i) is the total transition flow out of state i.

Hand-Off Arrival Parameters

The average hand-off arrival rate of active session, $\Lambda_h$, the average hand-off arrival rate of k-suspended session, $\Lambda_r(k)$, where $1 \leq k \leq N$, the fraction of hand-off arrivals of active session that are g-type platform, $F_g$, and the fraction of hand-off arrivals of k-suspended sessions that are g-type platform, $F_{rg}(k)$, where $1 \leq k \leq N$, can be determined from the dynamics of the process itself. An iterative method can be used. The average hand-off departure rate of active sessions on g-type platforms can be expressed as $$\Delta_h(g) = \sum_{s=0}^{S_{max}} \mu_D(g) \cdot u(s,g) \cdot p(s). \quad (31)$$

Thereafter, the overall average hand-off departure rate of active sessions can be written as $$\Delta_h = \sum_{g=1}^{G} \Delta_h(g). \quad (32)$$

The average hand-off departure rates of k-suspended sessions on g-type platform can be expressed as $$\Delta_r(g,k) = \sum_{s=0}^{S_{max}} \mu_r(g) \cdot v(s,g,k) \cdot p(s). \quad (33)$$

Also, the overall average hand-off departure rates of k-suspended sessions can be written as $$\Delta_r(k) = \sum_{g=1}^{G} \Delta_r(g,k). \quad (34)$$

From these equations, we find that the fraction of hand-off departures of active sessions that are on g-type platforms is $$F'_g = \Delta_h(g)/\Delta_h, \quad (35)$$

and, the fraction of hand-off departures of k-suspended sessions on g-type mobility platform is $$F'_{rg}(k) = \Delta_r(g,k)/\Delta_r(k). \quad (36)$$

Since the maximum allowable reconnection attempts is N, there are N average hand-off departure rates and fractions, each corresponding to a value of k. Any hand-off departure of an active session of a g-type platform a cell corresponding to a hand-off arrival of active session of a g-type platform to another cell. Also, a hand-off departure of a k-suspended session of a g-type platform from a cell, corresponds a hand-off arrival of a k-suspended session of a g-type platform to another cell. Therefore, for a homogeneous system in statistical equilibrium, the hand-off arrival and departure rates per cell must be equal and the component hand-off arrival rates of k-suspended sessions and hand-off departure rates of k-suspended sessions, where $1 \leq k \leq N$, must also equal one another. That is we must have $$F_g = F'_g$$

$$F_{rg}(k) = F'_{rg}(k)$$

$$\Lambda_h = \Delta_h$$

$$\Lambda_r(k) = \Delta_r(k) \quad (37)$$

where $1 \leq k \leq N$.

Performance Measures

When the statistical equilibrium state probabilities and transition flow are found, the required performance measures can be calculated.

Carried Traffic

An important performance measure from a system point of view is the carried traffic. For given resources, larger carried traffic implies more efficient use and more revenue for the service provider. The carried traffic for g-type platform, $A_c(g)$, is $$A_c(g) = \sum_{s=0}^{S_{max}} u(s,g) \cdot p(s). \quad (38)$$

The total carried traffic, $A_c$, is $$A_c = \sum_{g=1}^{G} A_c(g). \quad (39)$$

Average Number of k-Suspended Sessions

The average number of k-suspended sessions on g-type platforms, $A_w(k,g)$, is $$A_w(k, g) = \sum_{s=0}^{s_{max}} v(s, g, k) \cdot p(s). \quad (40)$$

The average number of k-suspended sessions regardless of platform type, $A_w(k)$, is $$A_w(k) = \sum_{g=1}^{G} A_w(k, g). \quad (41)$$

Then, the average number of suspended sessions, $A_w$, is $$A_w = \sum_{k=1}^{N} A_w(k). \quad (42)$$

Blocking Probability

The blocking probability, $P_B$, is the average fraction of new call arrivals that fail to acquire a connection. Blocking events occurs when the cell is in one of state of following disjoint subsets of states $$L_B = \{s : u(s) \geq C - Ch_h\}. \quad (43)$$

Blocking probability is expressed as $$P_B = \sum_{s \in L_B} p(s). \quad (44)$$

Hand-Off Failure Probability

The hand-off failure probability, $P_H$, is the average fraction of hand-off attempts that are denied in the target cell because the system in target cell supports maximum supportable connections and maximum supportable suspended sessions. A session, either active or suspended, that is denied in the target cell due to the lack of system capacity will be forced into termination and cleared from system database. We define following disjoint set of states, in which hand-off attempts will fail $$L_H = \{s : u(s) = C, v(s) = H\}. \quad (45)$$

Then, the hand-off failure probability is expressed as $$P_H = \sum_{s \in L_H} p(s). \quad (46)$$

The hand-off attempt rate to a cell depends directly on the states of its neighboring cells (those from which it receives hand-offs), and not on the state of the target cell. So if we average over the states of the neighbors and recall that we are considering a homogeneous layout (in which all cells have the same parameters) equation (46) results.

Forced Termination Probability

The forced termination probability, $P_{FT}(g)$, is defined as the probability that a call on a g-type platform that is not blocked is forced into termination due to hand-off failure during its lifetime. The terminated call will be cleared from system. There are two possible scenarios in which a call is forcibly terminated due to a hand-off attempt failure during its lifetime. Firstly, a call, whether active or suspended, attempts its hand-off to a cell in which the system already supports the maximum number of connections and the maximum number of suspended sessions. In this case, a call will be forcibly terminated even if it hasn't finished its maximum allowable number of reconnection attempts. A premature termination of a session, either an active or suspended, which has not finished ,its maximum allowable reconnection attempts is called a non-maximum termination. Secondly, a suspended session is forcibly terminated if it reaches the maximum allowable number of reconnection attempts. It should be recalled that a suspended session will attempt its hand-off when it moves to another cell even though the radio link between mobile unit and base was disconnected. A hand-off attempt generated by a suspended session is counted as one reconnection attempt in the sense that the reconnection counter will be incremented. Therefore, the last attempt before termination can be either a retry attempt or a hand-off attempt. The termination of an N-suspended session due to the maximum number of allowable reconnection attempts being met is called a maximum termination.

For the purpose of calculating forced termination probability, we define the following disjoint set of states.

$$L_D = \{s : u(s) = C, v(s) \neq H\} \quad (47)$$

$$L_A = \{s : u(s) \neq C\}. \quad (48)$$

When the cell is one of states in $L_D$, the cell already supports the maximum number of active sessions but the number of suspended sessions in the cell is less than the maximum supportable suspended sessions. If a call, either active or suspended call, arrives due to a hand-off attempt when a cell is one of these states, it will stay as a suspended session unless the reconnection counter indicates maximum allowable reconnection attempts, (N+1). When the counter of call indicate (N+1), a call will be forced into termination.

When the cell is one of the states $L_A$, the system supports fewer connections than the limit. Therefore, an arriving hand-off, either active or suspended call, and retry attempt will succeed in gaining access to network resources. The corresponding probabilities are $$P_D = \sum_{s \in L_D} p(s) \quad (49)$$

$$P_A = \sum_{s \in L_A} p(s). \quad (50)$$

It is to be understood that only the failure of a hand-off attempt could cause a non-maximum termination. No retry attempt can result in a non-maximum termination since the suspended session already occupies one of the H spaces allowed for suspended sessions in each cell. Succinctly, a retry attempt cannot cause a forced termination unless it is the last allowable attempt for that session and it fails to reconnect.

Figure 3:
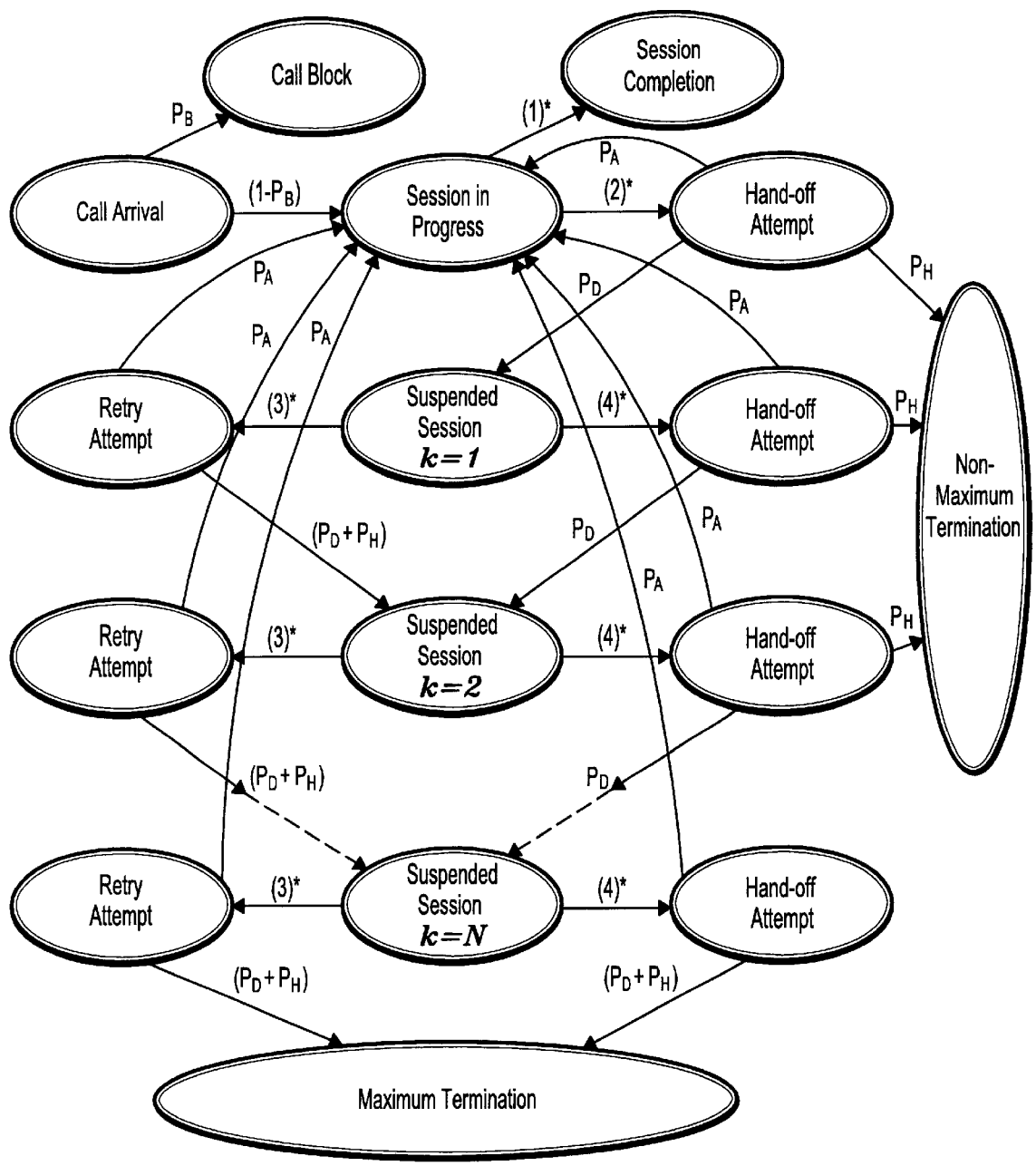
FIG. 3 is a flow diagram illustrating events in the lifetime of a session according to one aspect of the present invention.

FIG. 3 is a flow graph depicting events in the lifetime of a call. As illustrated, some suspended or active sessions will be forced to terminate because of the failure of their hand-off attempts or retry attempts. The probability that an active session on a g-type platform attempts a hand-off as an upcoming event before its session completion can be written as $$\frac{\mu_D(g)}{\mu(g)+\mu_D(g)}.$$

And, the probability that an active session on a g-type platform successfully completes its session before a trial of hand-off attempt can be written as $$\frac{\mu(g)}{\mu(g)+\mu_D(g)}.$$

The probability that an active session becomes a 1-suspended session due the lack of system capacity in target cell is $P_D$. For suspended sessions, there are two possible upcoming events, hand-off or retry attempt. When the dwell time of a suspended session is less than the next trial time, the session will attempt hand-off. Otherwise, the session will attempt retry. The probability that a k-suspended session on a g-type platform attempts hand-off as a next upcoming event can be written as $$\frac{\mu_D(g)}{\mu_r(k,g)+\mu_D(g)}.$$

Also, the probability that a k-suspended session on a g-type platform attempts retry as the next upcoming event can be written as $$\frac{\mu_r(k,g)}{\mu_r(k,g)+\mu_D(g)}.$$

A hand-off event of a suspended session, it can result in resumption of an active session, a forced termination, or continued suspension (with an incremented reconnection attempt counter). These events occur with respective $P_A, P_H,$ and $P_D$.

A retry attempt generated by a suspended session, can result in: 1) the suspended session becoming active (with probability of $P_A$); 2) the continued suspension with incremented reconnection counter if the maximum number of allowed reconnection attempts has not been reached (with probability $P_H+P_D$).

There are two possible scenarios in which a k-suspended session becomes a (k+1)-suspended session. One is to attempt hand-off and be continued suspension. The other is to generate a reconnection attempt and be continued in suspension. Therefore, the probability, $\theta_k(g)$, that a k-suspended session on a g-type platform becomes a (k+1)-suspended session through either a retry or a hand-off attempt can be written as $$\theta_k(g) = \frac{\mu_r(k,g)\cdot(P_H+P_D)}{\mu_r(k,g)+\mu_D(g)} + \frac{\mu_D(g)\cdot P_D}{\mu_r(k,g)+\mu_D(g)} \quad (51)$$

$$= \frac{\mu_r(k,g)\cdot(P_H+P_D)+\mu_D(g)\cdot P_D}{\mu_r(k,g)+\mu_D(g)} \quad (52)$$

where $1 \leq k < N$.

Even though a call has experienced suspension, the counter will be reset to zero if a suspended call is activated. A call may have suspension experiences during its lifetime before it is successfully completed. The suspension and reconnection process is initiated after an active call fails a hand-off attempt. Therefore, the probability that an active call has a hand-off attempt as an upcoming event and acquire connection through either successful hand-off or retry attempt should be calculated for measuring the system performance. The probability, $\eta(g)$, that an active call on a g-type platform, will remain active is the sum of the probabilities of the following events: 1) it succeeds on the upcoming hand-off attempt, 2) fails on the upcoming event and (therefore) is suspended but it succeeds in its 1-retry attempt or next hand-off attempt, 3) becomes a suspended session and fails its 1-retry attempt but succeeds its 2-retry attempt or next hand-off attempt, and so on. Therefore, the probability can be written as $$\eta(g) = \frac{\mu_D(g)\cdot P_A}{\mu(g)+\mu_D(g)} + \frac{\mu_D(g)\cdot P_D\cdot P_A}{\mu(g)+\mu_D(g)} + \quad (53)$$
$$\frac{\mu_D(g)\cdot P_D\cdot P_A\cdot\theta_1(g)}{\mu(g)+\mu_D(g)} + \frac{\mu_D(g)\cdot P_D\cdot P_A\cdot\theta_1(g)\cdot\theta_2(g)}{\mu(g)+\mu_D(g)} + \ldots +$$
$$\frac{\mu_D(g)\cdot P_D\cdot P_A\cdot\theta_1(g)\cdot\theta_2(g)\cdots\theta_{N-1}(g)}{\mu(g)+\mu_D(g)}.$$

$$= \frac{\mu_D(g)\cdot P_A}{\mu(g)+\mu_D(g)}\cdot\left(1+P_D\left(1+\sum_{k=1}^{N-1}\prod_{m=1}^{k}\theta_m(g)\right)\right) \quad (54)$$

where $1 \leq k \leq N$.

Non-Maximum Termination Probability

In previous discussion, we defined premature termination of a session, either an active or suspended, as on which has not finished its maximum allowable number of reconnection attempts, as a non-maximum termination. Therefore, if the counter of a terminal does not indicate (N+1) when a session is forced into termination, the event is called non-maximum termination. The non-maximum termination probability, $P_{NT}(g)$, is defined as the probability that a call on a g-type platform, either active or suspended, that is forced into termination during its lifetime due to a failure of a hand-off attempt even though it has not finished its maximum allowable number of reconnection attempts. This probability is the sum of the probabilities that a session is forced into termination when it is a 1-suspended session, 2-suspended session, . . . , up to an N–1 suspended session. The probability, $\psi_0(g)$, that a call on a g-type platform is forcibly terminated due to a failure of hand-off during its lifetime can be written as $$\psi_0(g) = \frac{\mu_D(g)\cdot P_H}{\mu_D(g)+\mu(g)} + \frac{\mu_D(g)\cdot P_H\cdot\eta(g)}{\mu_D(g)+\mu(g)} + \frac{\mu_D(g)\cdot P_H\cdot\eta(g)^2}{\mu_D(g)+\mu(g)} + \ldots \quad (55)$$

$$= \frac{\mu_D(g)\cdot P_H\cdot\sum_{i=0}^{\infty}\eta(g)^i}{\mu_D(g)+\mu(g)}. \quad (56)$$

In the same fashion, the probability that a call on a g-type platform is forcibly terminated while it is a k-suspended session, where 0<k<N, due to a failure of hand-off during its lifetime, $\psi_k(g)$, can be written as $$\psi_k(g) = \frac{\mu_D(g)\cdot P_D\cdot\sum_{i=0}^{\infty}\eta(g)^i}{\mu_D(g)+\mu(g)}\cdot\left(\frac{\mu_D(g)\cdot P_H}{\mu_D(g)+\mu_r(k,g)}\right)\cdot\prod_{m=1}^{k-1}\theta_m(g). \quad (57)$$

Then, the overall non-maximum termination probability, $P_{NT}(g)$, can be written as $$P_{NT}(g) = \psi_0(g) + \psi_1(g) + \cdots \psi_{N-1}(g) \quad (58)$$

$$= \frac{\mu_D(g) \cdot P_H \cdot \sum_{i=0}^{\infty} \eta(g)^i}{\mu_D(g) + \mu(g)} \cdot \left(1 + \frac{\mu_D(g) \cdot P_D}{\mu_D(g) + \mu_r(k,g)} \sum_{k=1}^{N-1} \prod_{m=1}^{k-1} \theta_m(g)\right) \quad (59)$$

$$= \frac{\mu_D(g) \cdot P_H}{\mu_D(g) + \mu(g)} \cdot \frac{1}{1 - \eta(g)} \cdot \left(1 + \frac{\mu_D(g) \cdot P_D}{\mu_D(g) + \mu_r(k,g)} \sum_{k=1}^{N-1} \prod_{m=1}^{k-1} \theta_m(g)\right). \quad (60)$$

Probability of Maximum Termination

The probability of maximum termination, $P_{MT}(g)$, is defined as the probability that a call on a g-type platform that is forced to terminate during its lifetime because the maximum allowable number of reconnection attempts have been reached. The last attempt of maximum termination can be either a hand-off or retry. The probability of maximum termination, $P_{MT}(g)$, can be written as $$P_{MT}(g) = \frac{\mu_D(g) \cdot (P_H + P_D) \cdot P_D \cdot \prod_{i=1}^{N-1} \theta_i(g)}{(\mu(g) + \mu_D(g)) \cdot (1 - \eta(g))}. \quad (61)$$

The forced termination probability, $P_{FT}(g)$, is defined as the probability that a call on a g-type platform that is not blocked is forced into termination due to hand-off failure or failure of reconnection attempts during its lifetime. It can be written as $$P_{FT}(g) = P_{NT}(g) + P_{MT}(g) \quad (62)$$

Average Time Per Suspension

A call may experience a suspension or some suspensions during its lifetime. When a call becomes a suspended session, the terminal on that call will start its reconnection process. This reconnection effort can succeed or fail. The average time per suspension on a g-type platform, W(g), is the expected time that reconnection process will carry on. Therefore, it is the average time frame from the point that an active session becomes a suspended session to the point that a suspended session becomes an active session or be forced into termination.

To calculate the average time per suspension, determine the average rate of suspension and the number of calls in suspension from the state probabilities. Little's law will then be applied to find the average amount of time in suspension.

The average rate of call suspension for a g-type platform, H(g), is given by $$H(g) = \sum_{s \in L_D} p(s) \cdot [\Lambda_h \cdot F_g] \quad (63)$$

$$= P_D \cdot \Lambda_h \cdot F_g. \quad (64)$$

And we can determine the average number of suspended calls on g-type platform, $A_w(g)$, from equation (40) as follows $$A_w(g) = \sum_{k=1}^{N} A_W(k, g). \quad (65)$$

Thereafter, we can find the average time per suspension of a g-type call, W(g). Using Little's law, this is $$W(g) = A_w(g)/H(g). \quad (66)$$

Average Number of Suspensions Per Session

The average number of suspensions per session on g-type platform, S(g), is the expected number of suspensions for a call on g-type platform during its lifetime. Firstly, we will determined the average rate of accommodating calls on g-type platform, E(g). Since some part of calls will be blocked due to lack of system capacity, the average rate of accommodating calls on g-type platform, E(g), can be expressed as $$E(g) = \Lambda_n(g) \cdot (1 - P_B). \quad (67)$$

And, then the average number of suspensions per session on g-type platform, S(g), can be written as $$S(g) = H(g)/E(g). \quad (68)$$

Average Times Per Session
Average Time in Suspension Per Session

The average time in suspension per session on g-type platform, $M_s(g)$, is the expected waiting time for a call on g-type platform during its lifetime. Using Little's law, we can write this as $$M_s(g) = S(g) \cdot W(g) = \frac{H(g)}{E(g)} \cdot \frac{A_w(g)}{H(g)} = \frac{A_w(g)}{E(g)}. \quad (69)$$

Average Total Lifetime of a Session

Let $M_t(g)$ denote the average total lifetime of a call on a g-type platform, regardless of how the call ends. Recall that a call can finish its session successfully or unsuccessfully, i.e. by call completion or forced termination). The quantity $M_t(g)$ is the expected time that a call spends in the system. Using Little's law, this can be written as $$M_i(g) = \frac{A_c(g) + A_w(g)}{E(g)}. \quad (70)$$

Suspension Time

The fraction of a call's lifetime that it is suspended is an important performance metric. For a call on a g-type platform, this is denoted by L(g). This can be written as $$L(g) = \frac{M_s(g)}{M_i(g)} = \frac{A_w(g)}{A_c(g) + A_w(g)}. \quad (71)$$

EXPERIMENTAL RESULTS

Numerical results were generated using the approach described herein. The unencumbered session duration was set at 100s for numerical purposes. Two types of platforms were considered, low mobility and high mobility. A mean dwell time of 500s was assumed for low mobility platforms and 100s for high mobility platform. The mean k-trial time of a k-suspended session on g-type platform was chosen to be 20s for $1 \leq k \leq N$. (That is, $\overline{T}_r(k, g) = 20s$). It is to be understood that it is possible that the mean trial time of k-suspended session can be dependent on k and g, for example $\overline{T}_r(1, g) \neq \overline{T}_r(2, g)$. For convenience and computational purposes, we took k-trial time to be 20 sec., independently of k and g.

For all calculations described herein, $\alpha(g)=1$ was assumed, so that platform types generate new calls at the same average rate. We took the number of channels in a cell to be 25; and a total of 600 non-communicating users (300 users for slow mobiles and 300 users for fast mobiles) in each cell was assumed.

The abscissas for FIGS. 4–12 illustrate call demand with the assumptions stated above. In these, the abscissas are the new call origination rate per platform for platform type 1. The ratio of new call origination rates of other platform types to that of type 1 platforms were fixed by the parameters $\alpha(g)$. An abscissa value of $2.78 \times 10^{-4}$ calls/s corresponds roughly to one call per hour per user and a (new) offered load of 16.5 erlangs. The figures are for cells with 25 channels.

If a maximum of three reconnection attempts is allowed for a suspended session, and (up to) four suspended sessions can be supported in a cell, these parameter choices result in 73,710 permissible states. We used a desktop Sun Ultra-2 workstation for the calculations. About forty minutes of running time was needed to determine the cell state probabilities. We performed ten calculations, with different call origination rates, to generate FIGS. 4–12. So, the total time needed to calculate the performance characteristics shown in these figures was about seven hours.

Figure 4:
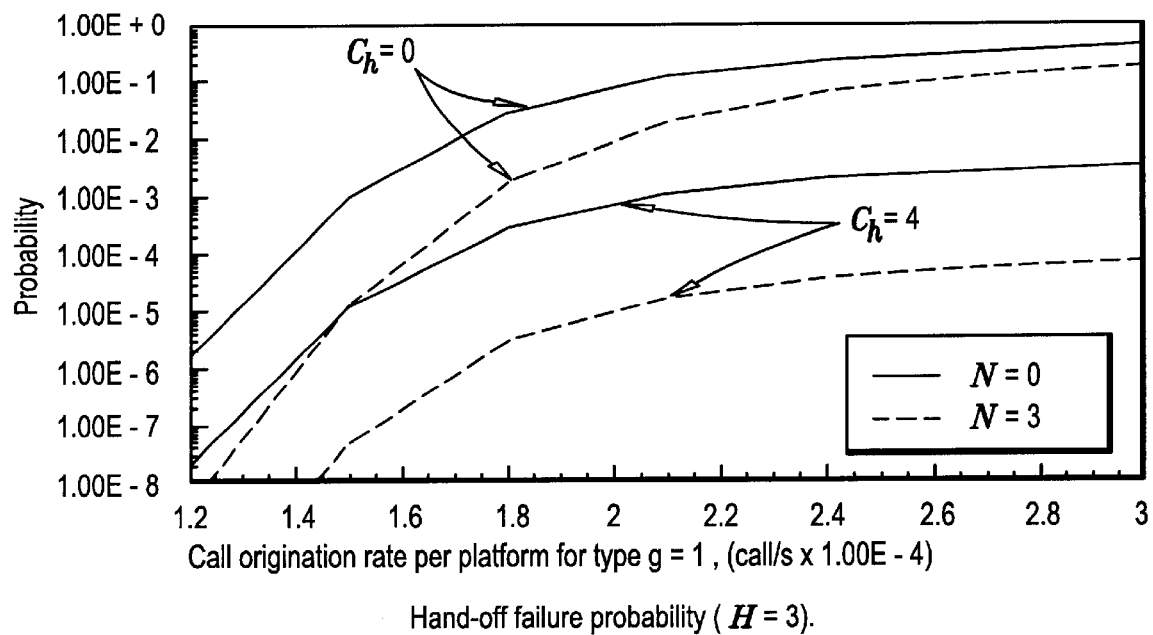
FIG. 4 is a graphical diagram illustrating experimental results of a hand-off failure probability as a function of new call origination rate.
Figure 5:
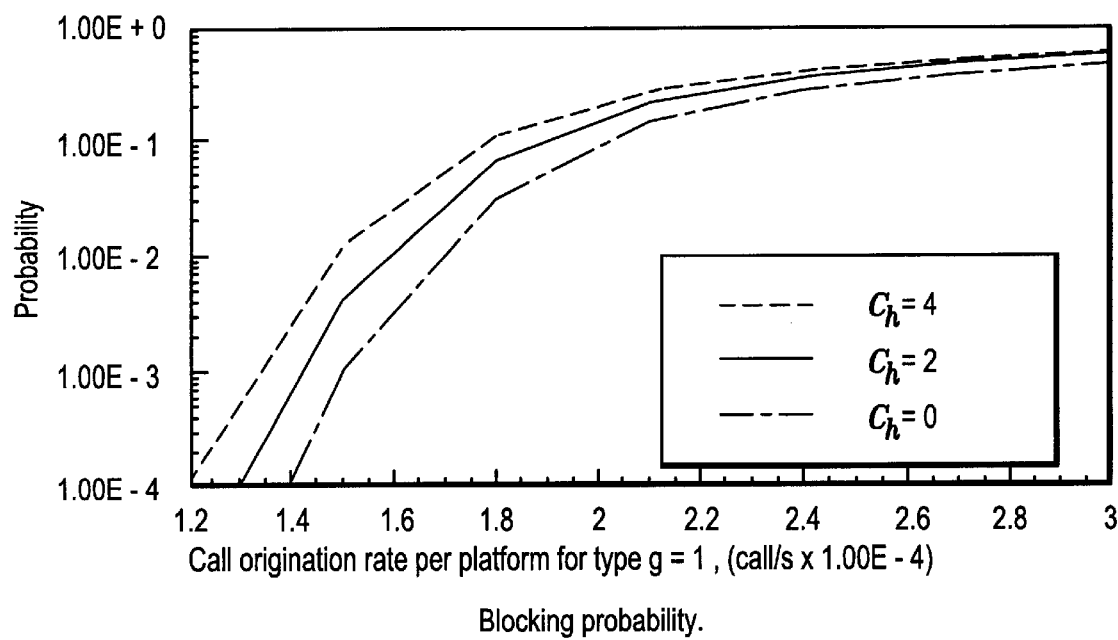
FIG. 5 is a graphical diagram illustrating experimental results of a blocking probability as a function of new call origination rate.

When an active or suspended session requires a hand-off, the session is terminated if there are C connections in progress in the target cell and no waiting spaces are available. This probability is denoted $P_H$ and is a calculated result. FIG. 4 shows hand-off failure probability, $P_H$, as a function of new call origination rate on type 1 platform. While many parameters affect forced termination probability, the influence of $P_H$ is very strong. There are two important parameters that can control hand-off failure probability in our system configuration. One is the number, $C_h$, of cut-off priority. Clearly, it is seen that if more channels are reserved for hand-off or retry attempts, a smaller hand-off failure probability is obtained. However, as we can see in FIG. 5, with increasing $C_h$, new call arrivals will be more likely to fail to acquire a connection. The other important parameter is the number, N, of maximum allowable of reconnection attempts. As this parameter is increased, a session is less likely to be terminated.

Figure 6:
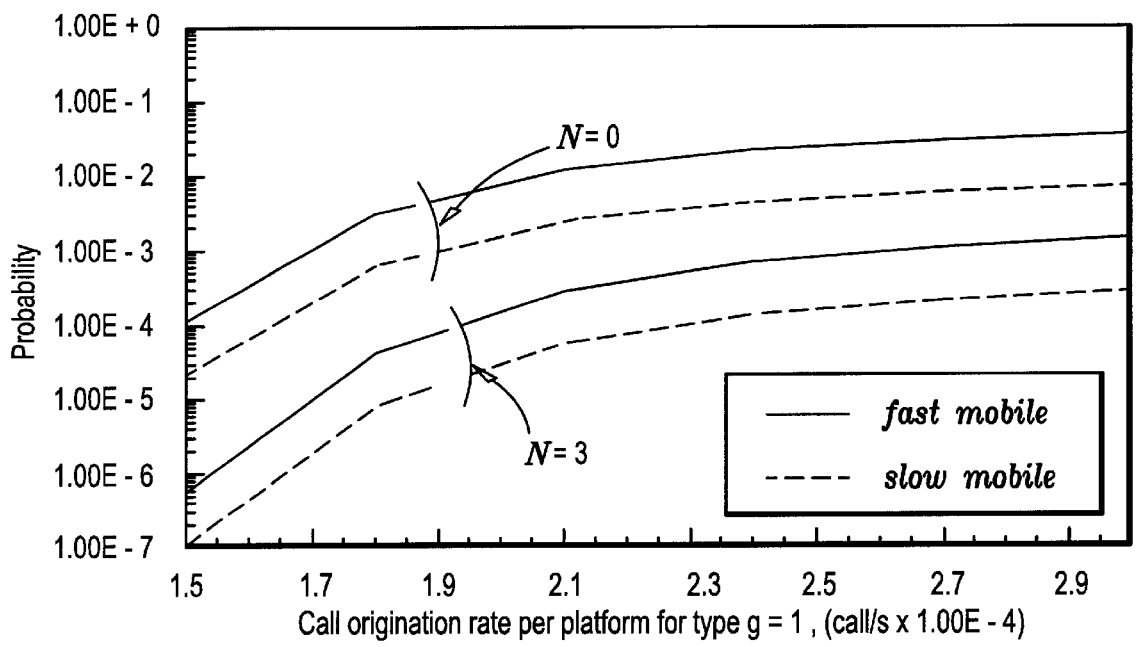
FIG. 6 is a graphical diagram illustrating experimental results of the dependence of forced termination probability on the number of allowable reconnection attempts as a function of new call origination rate.
Figure 10:
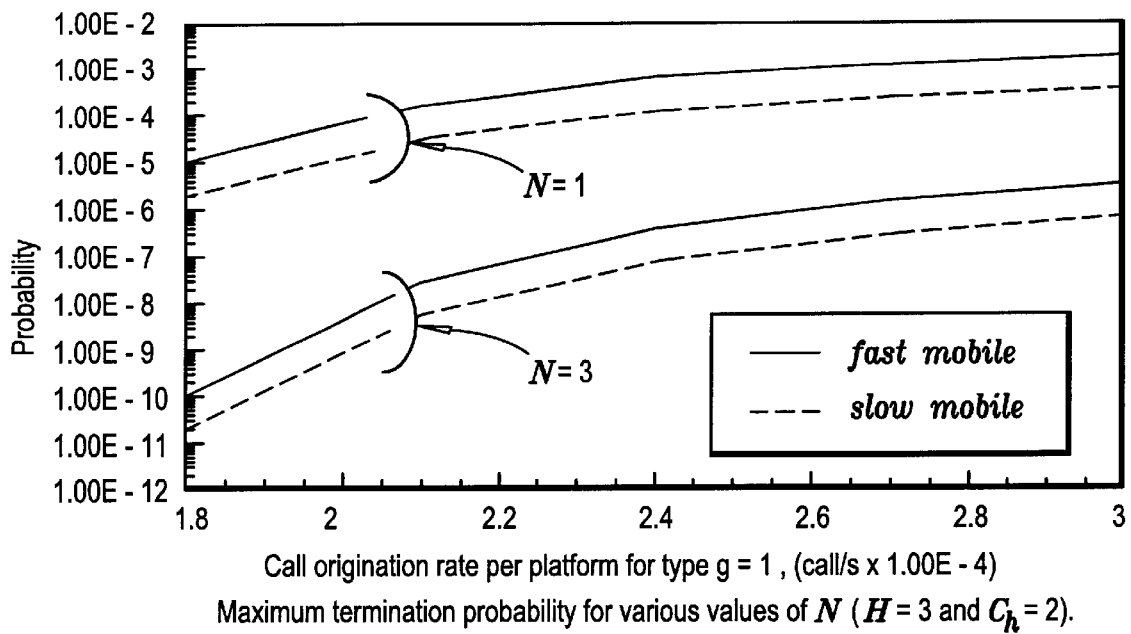
FIG. 10 is a graphical diagram illustrating experimental results of the dependence of maximum termination probability on the maximum number of reconnection attempts as a function of new call origination rate.

FIG. 6 illustrates the dependence of the forced termination probability on the number of maximum allowable reconnection attempts, N. As we can see, increasing N results in fewer sessions being forced to terminate during their lifetimes. For an abscissa value of $2.0 \times 10^{-4}$ calls/sec, forced termination probability decreases by about two orders of magnitude as N increases from 0 to 3. It is also seen in FIG. 10 that this is mainly due to a reduction in maximum termination probability. We see that increase of maximum allowable reconnection attempt, N, has a dramatic affect on reducing of maximum termination probability.

Figure 7:
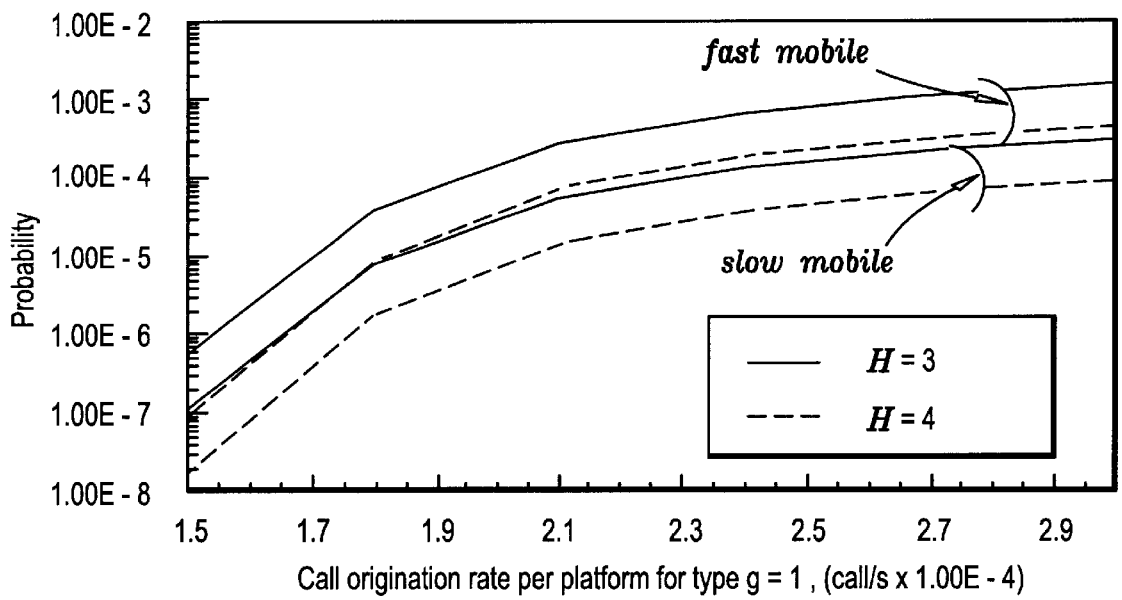
FIG. 7 is a graphical diagram illustrating experimental results of the dependence of forced termination probability on the maximum number of supported suspended sessions as a function of new call origination rate.
Figure 9:
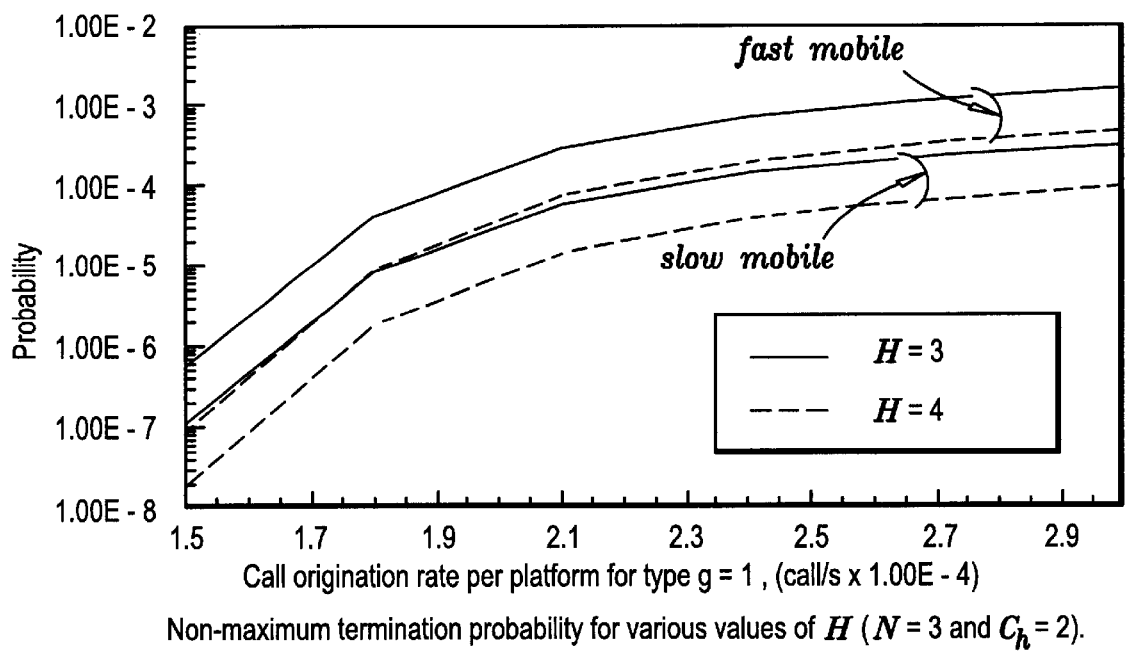
FIG. 9 is a graphical diagram illustrating experimental results of the dependence of non-maximum termination probability on the maximum number of supported suspended sessions as a function of new call origination rate.

FIG. 7 shows the dependence of forced termination probability on the maximum number, H, of suspended sessions that are supported. The more calls that can be supported as suspended sessions, the less the forced termination probability. For an abscissa value of $2.0 \times 10^{-4}$ calls/sec, forced termination probability decreases by about one order of magnitude as H increases from 3 to 4. It is seen in FIG. 9 that this is mainly because of reduction of non-maximum termination probability.

Figure 8:
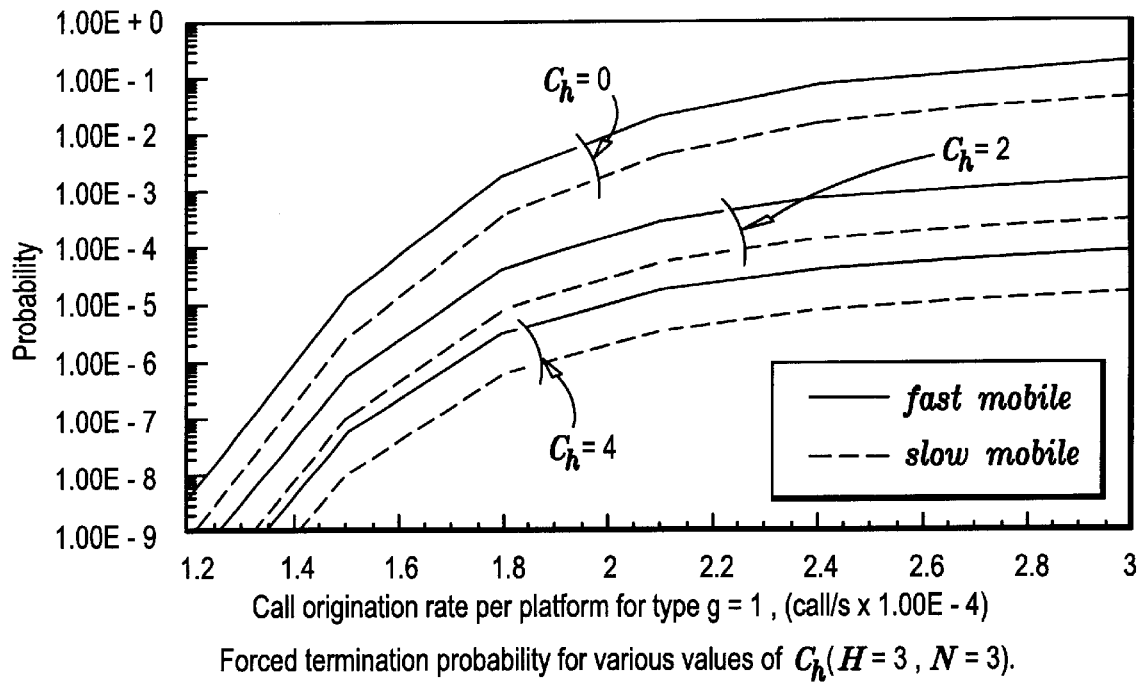
FIG. 8 is a graphical diagram illustrating experimental results of forced termination probability for various values of cut-of priority as a function of new call origination rate.

FIG. 8 illustrates the forced termination probability for various value of $C_h$ used for cut-off priority. When we increase the number of connections that are reserved for hand-off or reconnection attempts, forced termination probability is decreased; but (as we see in FIG. 4) blocking of new calls is increased. It is also seen that calls on slow mobiles have smaller forced termination probability. That is because a call on slow mobile can finish its session with relatively fewer hand-offs during its lifetime.

Figure 11:
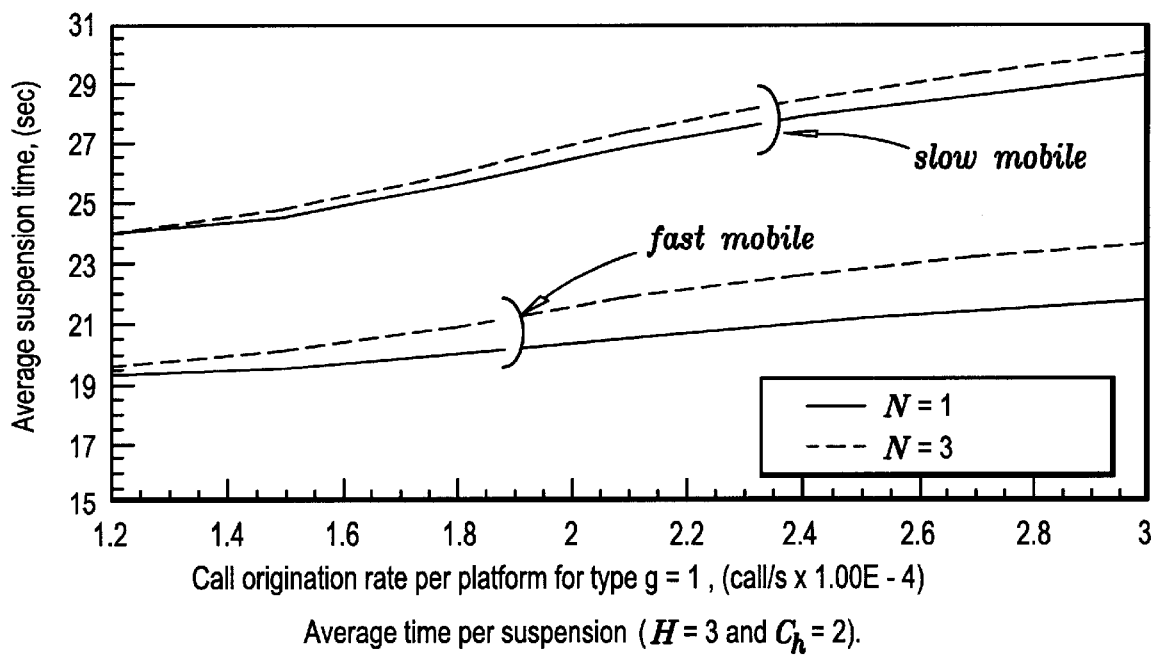
FIG. 11 is a graphical diagram illustrating experimental results of the dependence of average time per suspension as a function of new call origination rate.

FIG. 11 illustrates the dependence of average time per suspension, W(g), on call demand. The number N, of maximum allowable reconnection attempts and the platform mobility are parameters. Consider suspended sessions on fast mobiles in comparison with those on slow platforms. Since reconnection attempts are made at hand-off events, the former would generally have earlier opportunities to resume active status. Thus calls on slow mobiles have greater average waiting time per suspension than calls on fast mobiles. This is shown in the figure. For an abscissa value of $2.0 \times 10^{-4}$ calls/sec, calls on slow mobiles have about 5 sec. more waiting time than calls on fast mobiles. It is seen that increasing N increases W(g). With increasing call demand this trend is clearer. This is because, with higher N, fewer calls will undergo forced termination and the queue of suspended calls will be increased.

Figure 12:
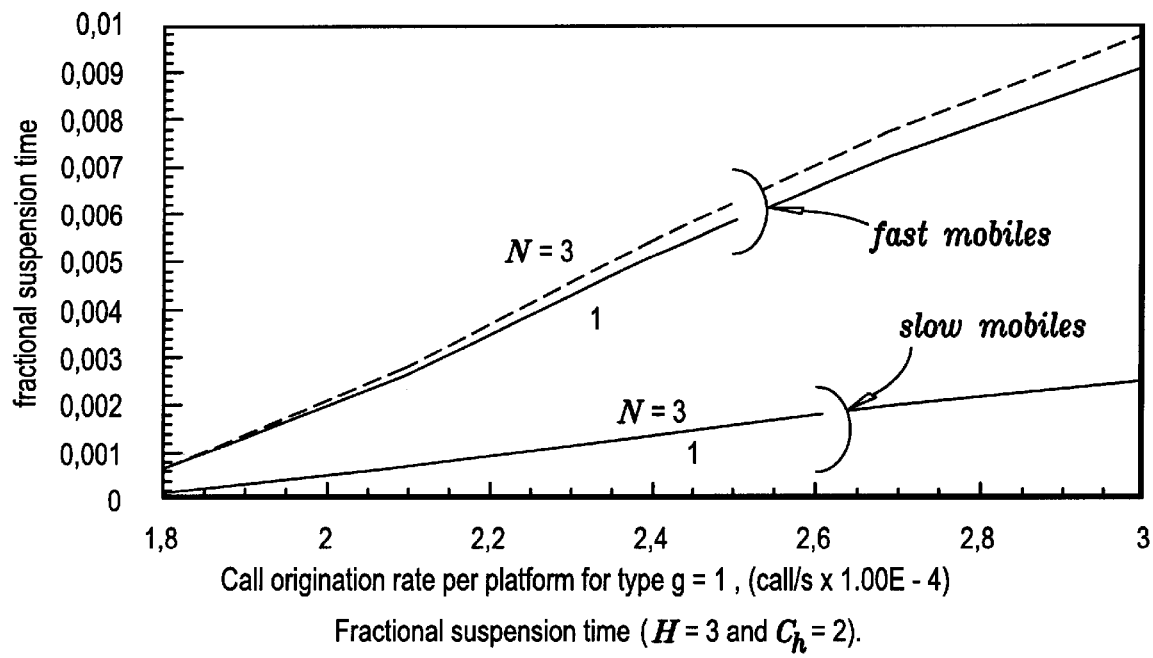
FIG. 12 is a graphical diagram illustrating experimental results of the dependence of fractional suspension time on the number of allowable reconnection attempts as a function of new call origination rate.

FIG. 12 illustrates the fractional suspension time with N as a parameter. It is seen that with increasing call demand the fractional suspension time increases. This is because with increasing call demand the system is increasingly crowded, so a call is more likely to be suspended. It is also seen that calls on fast mobiles have a greater fractional suspension time than calls on slow mobiles. Consider calls on fast mobiles in comparison with those on slow mobile. Recall from FIG. 6 that increasing N reduces the forced termination probability for calls on both fast and slow platforms. Fast mobiles especially benefit from increasing N. That is, more are served to completion. However, we see from FIG. 12 that these calls will spend more of their lifetime in suspension. Thus, both the likelihood of successful completion and the fraction of time spent in suspension increase with increasing N. The effect is more pronounced for calls on fast mobiles.

In summary, in the above-described embodiment, to support mobile computing (and other semi-autonomous mobile-user) applications in a cellular communication system, a scheme was described which provides automated attempts to maintain network connectivity for users. In the case of a link failure, this allows a user to continue in a temporary off-line mode while awaiting an active network connection in the background. The multi-dimensional birth-death process framework was used to compute theoretical traffic performance characteristics for the scheme. The model considers mixed platform mobilities, hand-off issues and priority, as well as reconnection attempts. Traffic performance depends on traffic demand and mix, the amount of priority given for hand-off calls and the limit on the number of allowable reconnection attempts. For example parameters, the probability of forced termination of a session during its lifetime can be reduced by two orders of magnitude using only a maximum of three retry attempts. Increasing the number of suspended sessions that can be supported at a base can significantly reduce the forced termination probability. About one order of magnitude decrease is achievable as H increases from 3 to 4. Also, increasing the number of channels reserved for hand-off attempts ($C_h$) can reduce the forced termination probability. About one order of magnitude improvement is achieved as $C_h$ increases from 0 to 2. However, $C_h$ should be chosen carefully, since increasing $C_h$ results in more new calls being blocked. By allowing more reconnection attempts for suspended sessions, the average suspension time increases slightly. Approximately 1 sec. for a call on fast mobile and less than 0.5 sec. for a call on slow mobile increases is shown as N increases from 1 to 3 with very high traffic situation.

Another exemplary application of the above-described admission control protocol for systems with multiple traffic classes and mixed platform types will now be described. As indicated above, the present invention may be employed for cellular communication systems that support both voice and data sessions. During a session a mobile user has access to network resources, although this access may be shared with others. Upon the failure of a link to a mobile data user, the scheme attempts to maintain connectivity to the network through transparent reconnection attempts. The approach allows periods of independent autonomous operation by mobile data terminals. Preemptive priority is used to guarantee transparency for voice sessions. An analytically tractable model that allows consideration of mixed platform types, (such as pedestrians, vehicles, etc.), having different mobility characteristics and mixed traffic classes, (such as voice, data, etc.) is described below. This embodiment is particularly useful in the context of wide area mobile computing applications.

Because of the time insensitive nature of many data traffic types, some delay during communication is not critical. However, a lost connection which results in the termination of a session is significant, since it waste valuable wireless resources. Therefore, the question of "how to maintain connectivity of a mobile user to the network" is an important issue. As described above, a system that supports widely disparate call traffic types as well as platforms with different mobility characteristics is preferable and a session-oriented approach is used. A session is typified as either a voice session or a data session. Preemptive priority is used to guarantee transparency for voice sessions. For data sessions, the scheme attempts to maintain a connection to the network. Data calls that are preempted or disconnected during the hand-off process, are allowed a fixed number of reconnection attempts. Only after a given number of such attempts to reconnect have failed, is the data session deemed to have failed. The strategy attempts to maintain connectivity for mobile data users in a way that is transparent to them. This allows for example, mobile computing users to continue functioning autonomously (though not indefinitely) in an off-line mode.

When the physical link between a mobile terminal that has an active data session and the network fails, the data session is suspended. The mobile terminal will attempt to reconnect by successive reconnection requests made at random time intervals. These are called reconnection attempts. A maximum number, N, of reconnection attempts is allowed for each suspended session. If a reconnection has not been secured after this maximum is reached, the session is considered to have failed and is cleared from the system.

To support suspended sessions and reconnection attempts for data sessions, the system should have allocated necessary control channels for signaling. Since the control channels also need wireless resources, we assume there is a maximum number, H, of suspended sessions that the system will allow in each cell. If a platform with a suspended session on board leaves its current cell, a reconnection attempt is made to establish a link in the new call. This hand-off attempt counts towards the limit, N. If, in the target cell, there are no available channels to accommodate the arriving data session, and if there are already H suspended sessions in the target cell, the arriving data session cannot be admitted in the target cell. So, even if a suspended session has not exhausted the allowable number of reconnection attempts, it will be forced into termination if (owing to the existence of H suspended sessions in the target cell), it fails its hand-off attempt.

Since voice sessions must be transmitted or received on a real time basis, reconnection attempts are not allowed. Instead, voice sessions have preemptive priority over data sessions for using channel resources. When a voice session arrives and finds all channels occupied, an active data session (if any are present) will be either suspended or terminated to accommodate it. The choice of which data session to be suspended or be terminated is assumed to be random. If there are no active data sessions that can be preempted to service the incoming voice session the voice arrival will not be accommodated. That is, it will be blocked if it is a new call, or terminated if it is a hand-off.

There are various reasons that cause an active data session to be suspended. For example, one reason is failure of a hand-off attempt. Specifically, if a data session attempts a hand-off when the channels in the target cell are fully occupied but, in the target cell, there are fewer than H data sessions suspended, the hand-off attempt will be fail but the session will wait for another connection opportunity as a suspended session. Another reason for suspension arises when an active data session is preempted by an arriving voice session. When a voice session arrives in a cell in which all channels are occupied and fewer than H sessions are in suspension, and, at least, one active session is of data type, an arriving voice session will obtain a connection but an active data session will be suspended.

Model Description

In the following we let g be an index that defines the platform type and mobility. Consider a suspended session that has already failed k-1 reconnection attempts. The next attempt is called the "k-reconnection attempt" where $1 \leq k \leq N$. It is important to emphasize that there are two driving processes that generate reconnection attempts. One is the retry process, which consists of successive statistically independent realizations of a random variable, $T_r(k, g)$, to generate epochs for retry attempt times for a suspended session. The other is the hand-off departure process—because hand-off attempts always try to establish a link and therefore count as reconnection attempts. The random variable, $T_r(k, g)$, gives the time from the previous reconnection event (either hand-off or retry) to the next anticipated retry attempt. The random variable, $T_r(k, g)$, can in general depend on k. Thus, the minimum rate of reconnection attempts depends on the number of attempts that have already been made. Of course, if the supporting platform leaves its current cell before the anticipated retry epoch, a hand-off attempt (to establish a link) will be made at that time and the value of k will be adjusted. If the session is in a suspended state after this attempt, a new random variable (for a retry epoch) will be generated. The random variable, $T_r(k, g)$, generated after the k-1 reconnection attempt, represents the maximum time to the next anticipated retry attempt. This is called the "k-trial time". The next reconnection attempt will be made either at this time or at the time that the supporting platform leaves the cell, whichever is the shortest. A suspended session that has not reestablished a link after k-1 reconnection trials and is waiting for the next ($k^{th}$) reconnection attempt, is called a "k-suspended session".

In the following description, we consider a large cellular system with many mobile platforms of several types. Each mobile can potentially generate a voice session or a data session. However, each platform can support at most one connection at any give time and each connection needs one channel (resource) to communicate. The platform types differ primarily in there mobility characteristics. The maximum number of simultaneous connections that each base station can support is C.

When a platform with either an active or suspended session moves to another cell, a hand-off is needed. We assume hand-off detection and initiation are perfect. For a voice session, a hand-off attempt will succeed to gain a connection in the target cell if there are fewer than C voice sessions in that cell. A voice session that fails to gain a connection will lose its wireless link and cleared from system. For a data session, a hand-off attempt will gain access to a connection in the target cell if there are less than C sessions, either of voice type or data type, in progress in that cell. When a hand-off of a data session fails, a session will be suspended if the reconnection counter in the terminal indicates less than N and no more than H suspended sessions are in the same cell.

Platform mobility is characterized using the concept of dwell time—a random variable which is defined as the duration of time that a two-way communication link of satisfactory quality can be maintained between a platform and its current base, for whatever reason. The amount of time that a session must use a channel for satisfying communication is modeled using the concept of unencumbered session duration. The unencumbered session duration is a random variable, which is the amount of time that the call would spend in service if there were no suspensions or forced termination. Similarly, the k-trial time is a random variable. A k-suspended session will execute a retry attempt after the epoch of the k-trial time unless it moves to another cell. If a k-suspended session moves to another cell before the epoch of the k-trial time, a hand-off attempt will be made.

Example Problem Statement

The system supports G types of mobile platforms, indexed by {g=1, 2, 3 . . . G} having different mobility characteristics. Potentially, a non-communicating platform generate two types of sessions, voice and data, however, no more than one session can be supported by a platform at any given time. The voice session origination rate from a non-communicating g-type platform is denoted $\Lambda_v(g)$. We define $\alpha(g)=\Lambda_v(g)/\Lambda_v(1)$. Similarly the data session generation rate from a non-communicating g-type platform is denoted $\Lambda_w(g)$ and we define $\beta(g)=\Lambda_w(g)/\Lambda_v(g)$. The number of non-communicating g-type platforms in any cell is denoted by v(g,0). Therefore, the total voice session generation rate for g-type platforms in any cell can be denoted $\Lambda_{nv}(g)=\Lambda_v(g)\times v(g,0)$ and the total data session generation rate for g-type platforms in a cell can be denoted $\Lambda_{nw}(g)=\Lambda_w(g)\times v(g,0)$. An infinite population model is assumed.

A model that considers resource use based on connection type is employed. Here, it is assumed that each active connection, either for a data session or a voice session, requires the same amount of resources. Each cell or gateway can support a maximum of C connections. There are no quotas for either specific mobility platform types or specific session types. We consider cut-off priority for hand-off arrivals (either voice or data sessions) and for reconnection attempts of suspended data sessions. Thus, $C_h$ connections in each cell are reserved for hand-off attempts (for either voice sessions or data sessions) and for reconnection attempts of suspended data sessions in the cell. A connection will be established for a new voice session only if there are less than $C-C_h$ active voice sessions in the cell. For an arriving data session, a connection will be made if there are fewer than C sessions, either of voice type or data type, in the cell. A hand-off attempt of a voice session will fail if there are C voice sessions in the cell.

A voice session that fails in a hand-off attempt will be terminated and cleared from the system. A hand-off attempt of a data type session will fail if there are C active sessions, either of voice type or data type, in the cell. A data session that fails in a hand-off attempt will be suspended if there are fewer than H suspended sessions the cell, and the session has not exceeded the maximum allowable number (N) of reconnection attempts. A platform is considered to "leave" the cell at the expiration of its current (random) dwell time. A communicating platform that leaves a cell generates a hand-off arrival to some other cell. The dwell time in a cell for a g-type platform is a ned random variable, $T_D(g)$, having a mean $\overline{T}_D(g)=1/\mu_D(g)$. More general dwell time distributions can be treated, at the cost of increased dimensionality of the state space. The unencumbered voice session duration on a g-type platform is a ned random variable, $T_v(g)$, having a mean $\overline{T}_v(g)=1/\mu_v(g)$. The unencumbered data session duration on a g-type platform is a ned random variable, $T_w(g)$, having a mean $\overline{T}_w(g)=1/\mu_w(g)$. The k-trial time of a suspended session on g-type platform is ned random variable, $T_r(g)$, having a mean $\overline{T}_r(k,g)=1/\mu_r(k,g)$, where $1\leq k\leq N$, and $\mu_r(k,g)$ (k=1, 2, . . . , N;g=1, . . . , G) is the parameter that determines the reconnection attempt rate for a k-suspended session on a g-type platform.

State Description

Considering a single cell, we define the cell state by a sequence of non-negative integers. When a maximum of N reconnection attempts are permitted for a suspended data session, the state of the cell can be written as G n-tuples as follows $$\begin{matrix} v_1 & w_1 & r_{1,1} & r_{1,2} & r_{1,3} & \ldots & r_{1,N} \\ v_2 & w_2 & r_{2,1} & r_{2,2} & r_{2,3} & \ldots & r_{2,N} \\ \vdots & \vdots & \vdots & \vdots & \vdots & \vdots & \vdots \\ v_G & w_G & r_{G,1} & r_{G,2} & r_{G,3} & \ldots & r_{G,N} \end{matrix} \quad (71)$$

where $v_g$ {g=1,2 . . . G} is the number of active voice sessions on g-type platforms, $w_g$ {g=1,2, . . . , G} is the number of active data sessions on g-type platforms, and $r_{g,k}$ {g=1,2, . . . , G; k=1,2, . . . , N} is the number of k-suspended sessions on g-type platforms. For convenience, we order the states using an index s=0,1 . . . $s_{max}$.

Thereafter, $V_g$, $w_g$, and $r_{g,k}$ can be written explicitly dependent on the state. That is $$v_g = v(s, g), w_g = w(s, g),$$

and $$r_{g,k} = r(s, g, k).$$

When the cell is in state s, the following characteristics can be determined. The number of voice sessions is $$v(s) = \sum_{g=1}^{G} v(s, g). \quad (72)$$

The number of active data sessions is $$w(s) = \sum_{g=1}^{G} w(s, g). \quad (73)$$

The number of suspended sessions, regardless of platform type, is $$r(s) = \sum_{k=1}^{N}\sum_{g=1}^{G} r(s, g, k). \tag{74}$$

And, the total number of sessions in progress in a cell is $$J(s)=v(s)+w(s). \tag{75}$$

There are constraints on permissible cell states. These includes the total number of active sessions in a cell must be fewer than or equal to maximum supportable connections, $J(s) \leq C$; and the total number of suspended sessions in a cell must be fewer than or equal to the maximum number of suspended sessions allowed in a cell, $r(s) \leq H$.

There are nine driving processes. These are: (1) generation of voice sessions (2) generation of data sessions (3) completion of voice sessions (4) completion of data sessions (5) hand-off arrival of voice sessions (6) hand-off arrivals of data session (either active or suspended) (7) hand-off departure of voice sessions (8) hand-off departure of data sessions (either active or suspended) (9) retry attempts. To allow solution within the multidimensional birth-death process framework, Markovian assumptions are used as in known in the art.

Flow Balance Equations and Hand-Off Arrival Parameters

The total transition flow into state s from any permissible predecessor state x is denoted as q(s,x). Then, the total flow out of state s is denoted q(s, s) and is given by $$q(s, s) = -\sum_{\substack{k=0 \\ k \neq s}}^{S_{max}} q(k, s). \tag{76}$$

The statistical equilibrium solution for the state probabilities can be found using the flow balance equations. This is a set of $S_{max}+1$ simultaneous equations for the unknown state probabilities, $$\sum_{j=0}^{S_{max}} q(i, j) \times p(j) = 0, \quad i = 0, 1, \ldots, S_{max} - 1 \tag{77}$$

$$\sum_{j=0}^{S_{max}} p(j) = 1, \tag{78}$$

in which, for, $i \neq j$, q (i, j) is the net transition flow into state i from state j, and q(i, i) is the total transition flow out of state i.

Hand-off parameters can be determined from the dynamics of the process itself. An iterative method can be used. The average hand-off departure rate of voice sessions on g-type platforms, $\Delta_{hv}(g)$, can be expressed as $$\Delta_{hv}(g) = \sum_{s=0}^{S_{max}} \mu_D(g) \cdot v(s, g) \cdot p(s). \tag{79}$$

Thereafter, the overall average hand-off departure rate of voice sessions, $\Delta_{hv}$, can be written as $$\Delta_{hv} = \sum_{g=1}^{G} \Delta_{hv}(g). \tag{80}$$

The average hand-off departure rate of active data sessions on g-type platforms, $\Delta_{hw}(g)$, can be expressed as $$\Delta_{hw}(g) = \sum_{s=0}^{S_{max}} \mu_D(g) \cdot w(s, g) \cdot p(s) \tag{81}$$

Thereafter, the overall hand-off departure rate of active data sessions, $\Delta_{hw}$, can be written as $$\Delta_{hw} = \sum_{g=1}^{G} \Delta_{hw}(g). \tag{82}$$

The average hand-off departure rates of k-suspended sessions on g-type platforms, $\Delta_r(g, k)$, can be expressed as $$\Delta_r(g, k) = \sum_{s=0}^{S_{max}} \mu_D(g) \cdot r(s, g, k) \cdot p(s) \tag{83}$$

Also, the overall average hand-off departure rates of k-suspended sessions, $\Delta_r(k)$, can be written as $$\Delta_r(k) = \sum_{g=1}^{G} \Delta_r(g, k). \tag{84}$$

From these equations, we find that the fraction of hand-off departures of voice sessions that are on g-type platforms, $F'_{vg}$, is $$F'_{vg}=\Delta_{hv}(g)/\Delta_{hv}, \tag{85}$$

the fraction of hand-off departures of active data sessions that are on g-type platform, $F'_{wg}$, is $$F'_{wg}=\Delta_{hw}(g)/\Delta_{hv}, \tag{86}$$

and, the fraction of hand-off departures of k-suspended sessions on g-type platforms, $F'_{rg}(k)$, is $$F'_{rg}(k)=\Delta_r(g,k)/\Delta_r(k). \tag{87}$$

For a homogeneous system in statistical equilibrium the hand-off arrival and departure rates per cell must be equal. We must have $$F_{vg}=F'_{vg}, F_{wg}=F'_{wg}, F_{rg}(k)=F'_{rg}(k), \Lambda_{hv}=\Delta_{hv}, \Lambda_{hw}=\Delta_{hw},$$

and $$\Lambda_r(k)=\Delta_r(k),$$

where $1 \leq k \leq N$.

PERFORMANCE MEASURES

Carried Traffic and Average Number of k-Suspended Sessions

An important performance measure from a system point of view is the carried traffic. Since the traffic of data sessions is transparent to user of voice session, the carried traffic of voice sessions is same regardless of the amount of data sessions in the system. The carried traffic of voice sessions for g-type platforms, $A_{cv}(g)$, is $$A_{cv}(g) = \sum_{s=0}^{S_{max}} v(s, g) \cdot p(s), \qquad (88)$$

Clearly, the traffic of data sessions strongly depends on the traffic of voice sessions in the system. The carried traffic of data sessions for g-type platform, $A_{cw}(g)$, is $$A_{cw}(g) = \sum_{s=0}^{S_{max}} w(s, g) \cdot p(s), \qquad (89)$$

The average number of k-suspended sessions for g-type platforms, $A_{cr}(g, k)$, is $$A_{cr}(g, k) = \sum_{s=0}^{S_{max}} r(s, g, k) \cdot p(s). \qquad (90)$$

Blocking Probability

The blocking probability for voice sessions is the average fraction of newly generated voice sessions that are denied access to a channel. Since there are no quotas for specific type of mobility platform, the blocking probability is the same for all types of platforms. Blocking of newly generated voice sessions occurs when the cell is in one of the states in $L_{Bv}$, for which the number of active voice sessions is $C-C_h$ or more, i.e., $L_{Bv}=\{s:v(s) \geq C-C_h\}$. And, the blocking probability of voice session, $P_{Bv}$, is expressed as $$P_{Bv} = \sum_{s \in L_{Bv}} p(s). \qquad (91)$$

The blocking probability for data sessions is the average fraction of newly generated data sessions that are denied access to a channel. A newly generated data session will be blocked if it finds all channels are occupied (by either by voice or data sessions). Blocking of newly generated data sessions occurs when the cell is in one of the states in the set, $L_{Bw}$, where $L_{Bw}=\{s:J(s)=C\}$. So, the blocking probability, $P_{Bw}$, for a data session is given by $$P_{Bw} = \sum_{s \in L_{Bw}} p(s). \qquad (92)$$

Hand-Off Failure Probability

The hand-off failure probability of voice sessions, $P_{Hv}$ is the average fraction of voice-session hand-off attempts that are denied admission in the target cell because all channels are already occupied by voice sessions in the cell. A voice-session hand-off failure occurs when the cell is in a state belonging to $L_{Hv}$, where $L_{Hv}=\{s:v(s)=C\}$. So, the hand-off failure probability of voice sessions is given by $$P_{Hv} = \sum_{s \in L_H} p(s). \qquad (93)$$

The hand-off failure probability of a data session, $P_{Hw}$, is the average fraction of hand-off attempts for data sessions that are denied admission in the target cell because all channels are occupied and H suspended sessions are in the cell. A data session, either active or suspended, that is denied admission in the target cell due to the lack of resources will be forced into termination and cleared from the system. A data-session hand-off attempt will fail if it occurs when the system is in one of the states belonging to the set $L_{Hw}=\{s:v(s)=C,r(s)=H\}$. So, the hand-off failure probability of data sessions is given by $$P_{Hw} = \sum_{s \in L_{WH}} p(s). \qquad (94)$$

Forced Termination Probability

A voice session that fails in a hand-off will be forced into termination. The forced termination probability of voice sessions on g-type platform, $P_{FTv}(g)$, is defined as the probability that a g-type voice session that is not blocked is interrupted due to hand-off failure during its lifetime. It can be shown that the forced termination probability of a voice type session is given by $$P_{FTv}(g) = \frac{\mu_D(g) \times P_{Hv}}{\mu_v(g) + \mu_D(g) \times P_{Hv}}. \qquad (95)$$

The forced termination probability of a data session on a g-type platform, $P_{FTw}(g)$, is defined as the probability that a data session that is not blocked is forced into termination during its lifetime.

DISCUSSION OF RESULTS

Numerical results were generated using the approach described above. For FIGS. 13–17, a mean unencumbered voice-session duration of 100s was assumed and a mean unencumbered data-session duration of 20s was assumed. Two platform types, low mobility and high mobility, were considered. A mean dwell time of 500s was assumed for a low mobility platform and 100s was assumed for a high mobility platform. A homogeneous system was assumed. The mean k-trial time of a g-type k-suspended session was chosen to be 10s for $1 \leq k \leq N$. The abscissas for FIGS. 13–17 reflect call demands with the assumptions stated above. In these, the abscissa is the new voice session origination rate for platform type 1 (denoted $\Lambda_{nv}(1)$). The ratio of new voice session generation rates from other platform types to that of type 1 platforms were held fixed with parameters $\alpha(g)$. Also, the new data session generation rate for platform type g is determined with respect to new voice session origination rate using parameters, $\beta(g)$. For all calculations, $\alpha(g)=\beta(g)=1$ is assumed.

Figure 13:
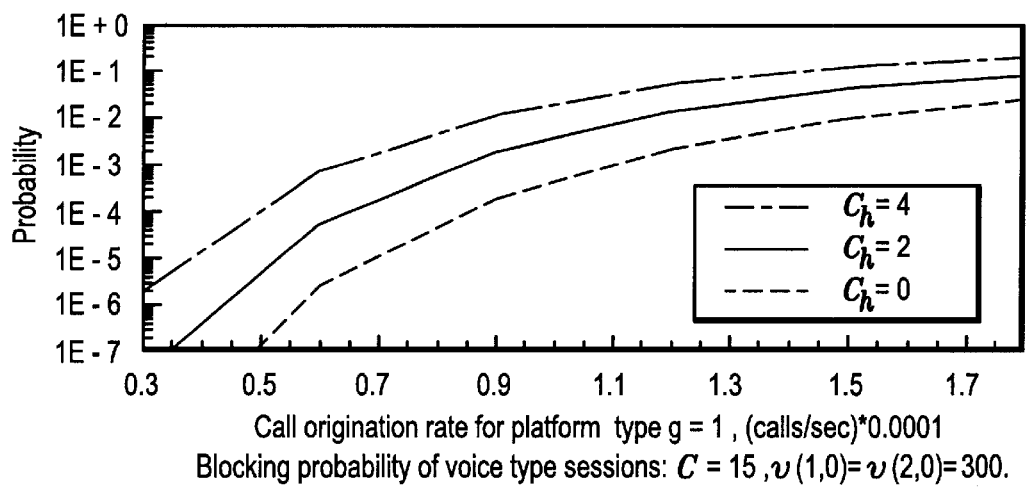
FIG. 13 is a graphical diagram illustrating experimental results of the dependence of blocking probability of a voice session on the number of reserved channels as a function of new call origination rate.
Figure 14:
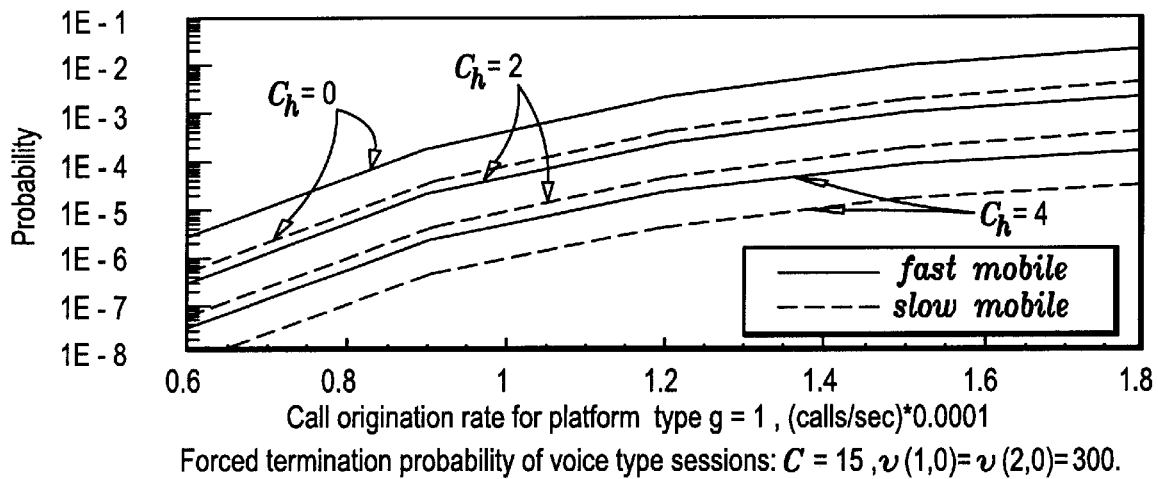
FIG. 14 is a graphical diagram illustrating experimental results of the dependence of forced termination probability of a voice session on the number of reserved channels as a function of new call origination rate.

FIGS. 13–14 illustrate voice traffic performances. Since the traffic of data sessions is transparent to users of voice session, the traffic performance of voice sessions with data traffic is identical to that without data traffic. FIG. 13 illustrates the blocking probability of voice session. As the number of reserved channels, $C_h$, is increased, obviously more newly generated voice session can not be accommodated.

FIG. 14 illustrates the forced termination probability of voice session. As the number $C_h$ increase, fewer voice sessions are forced into termination with the cost of blocking of more newly generated voice sessions. Clearly, voice sessions on fast mobile platforms have higher forced termination probability than that on slow mobile platform. This is because voice sessions on fast mobile platforms are most likely to experience more hand-offs during lifetime of a session.

Figure 15:
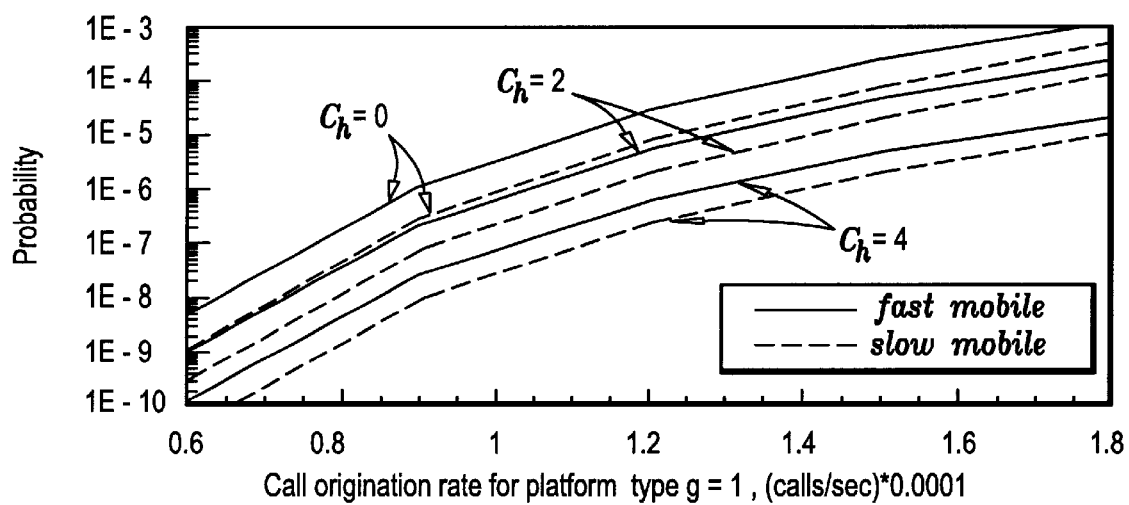
FIG. 15 is a graphical diagram illustrating experimental results of the dependence of forced termination probability of a data session on the number of reserved channels as a function of new call origination rate.
Figure 16:
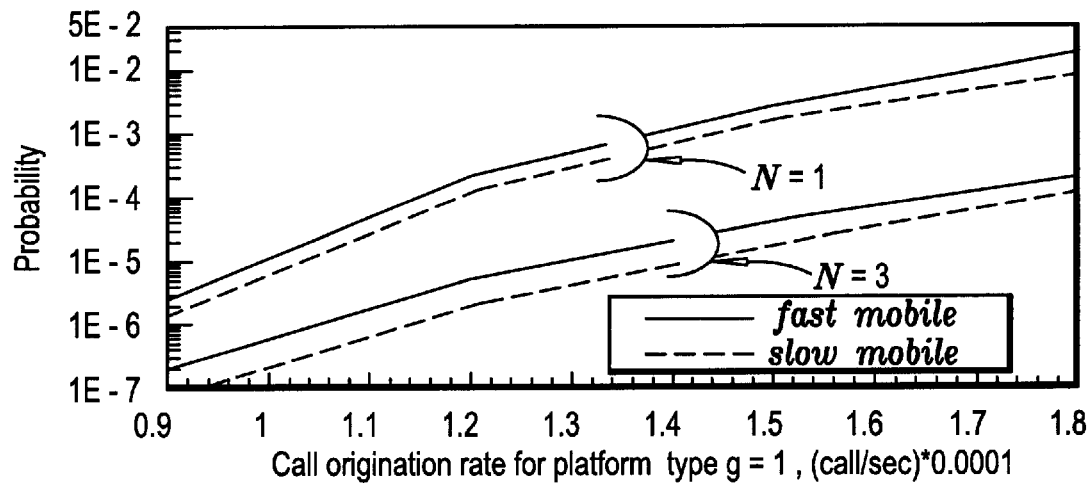
FIG. 16 is a graphical diagram illustrating experimental results of the dependence of forced termination probability of a data session on the number of maximum allowable reconnection attempts as a function of new call origination rate.
Figure 17:
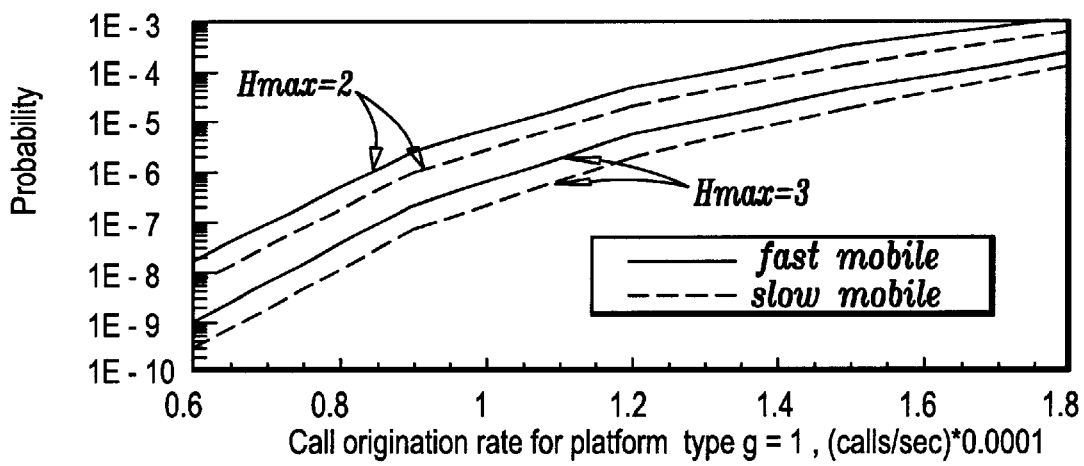
FIG. 17 is a graphical diagram illustrating experimental results of the dependence of forced termination probability of a data session on the number of maximum supportable suspended sessions as a function of new call origination rate.

FIG. 15 shows the forced termination probability of data sessions for various values of $C_h$ used for cut-off priority. When we increase $C_h$, clearly, forced termination probability of data sessions decreased. It is also seen that data sessions on slow mobile have smaller forced termination probability. This is because a data session on slow mobile can finish its session with relatively fewer hand-offs during its lifetime. FIG. 16 illustrates the dependence of forced termination probability of data sessions on the number of maximum allowable reconnection attempts, N. As we can see, increasing N results in fewer data sessions being forced to terminate during their lifetime. FIG. 17 illustrates the dependence of forced termination probability of data sessions on the number of maximum supportable suspended sessions, H. With increasing H, clearly, the less the forced termination probability of data session is expected.

In summary, with rapidly growing interest in the area of multimedia and mobile computing, the issue of how to accommodate diverse traffic types in wireless network may be solved using the admission control protocols described herein in which each type of media is managed with different strategy according to the characteristics. For time-insensitive data sessions, the system allows users to continue in a temporary off-line mode while awaiting an active network connection in the background. For time-sensitive voice session, the system gives preemptive priority over data traffic so that the transparency of data traffic is guaranteed to voice users.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. It is to be understood that all such changes and modifications are intended to be included within the scope of the invention as defined by the appended claims.

What is claimed is:

1. A method for controlling admission to a communications network, comprising the steps of:
    activating a session between a wireless terminal and the communications network;
    suspending the session if a communication link between the wireless terminal and communications network fails;
    automatically attempting to maintain connectivity between the wireless terminal and the communications network through transparent reconnection attempts; and
    reactivating the suspended session if reconnection is effected, wherein the step of automatically attempting to maintain connectivity comprises requesting a hand-off of the suspended session to an alternative gateway, wherein the method further comprises the step of allocating a predetermined maximum number of suspended session H that may be maintained by a gateway in the communications network, and wherein the step of suspending the session comprises the steps of:
        attempting a hand-off of the active session to the gateway; and
        if the hand-off fails, suspending the session if there are less than H suspended sessions in the gateway.

2. The method of claim 1, wherein the step of activating a session comprises the steps of:
    receiving a session request of a session seeking admission to the communications network, wherein the session request comprises at least one attribute corresponding to a service level of the session;
    determining if the session can be accommodated at the requested service level; and
    admitting the session, if the session can be accommodated.

3. The method of claim 2, wherein the at least one attribute comprises session type, mobile platform mobility, priority class and a combination thereof.

4. The method of claim 2, wherein the step of determining if the session can be accommodated comprises the steps of:
    determining a priority level of the session request and the amount of available resources in the communications network; and
    preempting system resources and suspending an active session having a priority that is lower than the priority of the session request, if necessary, to accommodate the session request.

5. The method of claim 1, wherein the step of activating a session comprises reactivating a suspended session.

6. The method of claim 1, further comprising the step of terminating the session if there are H suspended sessions in the gateway.

7. The method of claim 1, further comprising the step of allocating a predetermined maximum number of allowable reconnection attempts N of a suspended session.

8. The method of claim 7, wherein the step of automatically attempting to maintain connectivity comprises the steps of:
    performing a reconnection attempt to reactivate the suspended session;
    counting the number of reconnection attempts; and
    terminating the session, if the number of reconnection attempts exceeds N.

9. The method of claim 8, wherein the step of counting is performed by a counter in the wireless terminal.

10. The method of claim 9, wherein the counter is initialized when the suspended session is reactivated.

11. The method of claim 8, further comprising the step of computing a random time for a next reconnection attempt, after each failed reconnection attempt.

12. The method of claim 8, wherein the step of performing a reconnection attempt to reactivate the suspended session, comprises the step of attempting a hand-off of the suspended session to a target gateway, wherein the hand-off attempt to the target gateway is counted as a reconnection attempt.

13. A program storage device readable by a machine, tangibly embodying a program of instructions executable by the machine to perform method steps for controlling admission to a communications network, the method comprising the steps of:
    activating a session between a wireless terminal and the communications network;
    suspending the session if a communication link between the wireless terminal and communications network fails;
    automatically attempting to maintain connectivity between the wireless terminal and the communications network through transparent reconnection attempts; and
    reactivating the suspended session if reconnection is effected, wherein the step of automatically attempting to maintain connectivity comprises requesting a hand-off of the suspended session to an alternative gateway, wherein the program storage device further comprises instructions for performing the step of allocating a predetermined maximum number of suspended session H that may be maintained by a gateway in the communications network, and wherein the instructions for performing the step of suspending the session comprise instructions for performing the steps of:

attempting a hand-off of the active session to the gateway; and if the hand-off fails, suspending the session if there are less than H suspended sessions in the gateway.

14. The program storage device of claim 13, wherein the instructions for performing the step of activating a session comprise instructions for performing the steps of:

receiving a session request of a session seeking admission to the communications network, wherein the session request comprises at least one attribute corresponding to a service level of the session;

determining if the session can be accommodated at the requested service level; and admitting the session, if the session can be accommodated.

15. The program storage device of claim 14, wherein the at least one attribute comprises session type, mobile platform mobility, priority class and a combination thereof.

16. The program storage device of claim 13, wherein the instructions for performing the step of determining if the session can be accommodated comprise instructions for performing the steps of:

determining a priority level of the session request and the amount of available resources in the communications network; and preempting system resources and suspending an active session having a priority that is lower than the priority of the session request, if necessary, to accommodate the session request.

17. The program storage device of claim 13, wherein the instructions for performing the step of activating a session comprise instructions for reactivating a suspended session.

18. The program storage device of claim 13, further comprising instructions for performing the step of terminating the session if there are H suspended sessions in the gateway.

19. The program storage device of claim 13, further comprising instructions for performing the step of allocating a predetermined maximum number of allowable reconnection attempts N of a suspended session.

20. The program storage device of claim 19, wherein the instructions for performing the step of automatically attempting to maintain connectivity comprise instructions for performing the steps of:

performing a reconnection attempt to reactivate the suspended session;

counting the number of reconnection attempts; and terminating the session, if the number of reconnection attempts exceeds N.

21. The program storage device of claim 20 further comprising instructions for performing the step of computing a random time for a next reconnection attempt, after each failed reconnection attempt.

22. The program storage device of claim 20, wherein the instructions for performing the step of performing a reconnection attempt to reactivate the suspended session comprise instructions for performing the step of attempting a hand-off of the suspended session to a target gateway, wherein the hand-off attempt to the target gateway is counted as a reconnection attempt.

23. A communications system, comprising;

a wireless terminal; and a gateway comprising a system for controlling admission to the communications network, wherein the system comprises a lower communication layer adapted to maintain a connection of an active session between the wireless terminal and communications network through automatic and transparent reconnection attempts when a communication link between the wireless terminal and communications system fails, wherein the system for controlling admission comprises:

means for activating a session between the wireless terminal and the communications network;

means for suspending the session if a communication link between the wireless terminal and communications network fails;

means for automatically attempting to maintain connectivity between the wireless terminal and the communications network through transparent reconnection attempts, wherein the means for automatically attempting to maintain connectivity comprises means for requesting a hand-off of the suspended session to an alternative gateway; and means for reactivating the suspended session if reconnection is effected, wherein the system further comprises means for allocating a predetermined maximum number of suspended session H that may be maintained by a gateway in the communications network, and wherein the means for suspending the session comprises means for attempting a hand-off of the active session to the gateway; and if the hand-off fails, suspending the session if there are less than H suspended sessions in the gateway.

24. The communications system of claim 23, wherein the communications systems comprises one of a packet-switched network and a circuit-switched network.

25. The system of claim 23, wherein the wireless terminal comprises a mobile terminal or a fixed terminal.

* * * * *

UNITED STATES PATENT AND TRADEMARK OFFICE
CERTIFICATE OF CORRECTION

PATENT NO.     : 6,477,373 B1                                    Page 1 of 1
DATED          : November 5, 2002
INVENTOR(S)    : Rappaport et al.

It is certified that error appears in the above-identified patent and that said Letters Patent is hereby corrected as shown below:

<u>Column 1,</u>
Lines 13 and 14, "Grant No. N00014-15530" should read
-- Grant No. N00014-9511217 --

Signed and Sealed this

Third Day of June, 2003

JAMES E. ROGAN
*Director of the United States Patent and Trademark Office*